United States Patent
Han et al.

(10) Patent No.: US 10,674,359 B2
(45) Date of Patent: Jun. 2, 2020

(54) METHOD OF AUTHENTICATING EXTERNAL VEHICLE AND VEHICLE CAPABLE OF PERFORMING SAME

(71) Applicant: SAMSUNG ELECTRONICS CO., LTD., Suwon-si, Gyeonggi-do (KR)

(72) Inventors: Seong-won Han, Seoul (KR); Woo-jin Park, Yongin-si (KR); Dae-hyun Ban, Seoul (KR); Sang-soon Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 345 days.

(21) Appl. No.: 15/784,418

(22) Filed: Oct. 16, 2017

(65) Prior Publication Data

US 2018/0115898 A1   Apr. 26, 2018

Related U.S. Application Data

(60) Provisional application No. 62/412,384, filed on Oct. 25, 2016.

(30) Foreign Application Priority Data

Jul. 25, 2017   (KR) ........................ 10-2017-0094317

(51) Int. Cl.
  *H04W 12/06* (2009.01)
  *G05D 1/00* (2006.01)
  (Continued)

(52) U.S. Cl.
  CPC ............... *H04W 12/06* (2013.01); *G01S 5/00* (2013.01); *G01S 5/0072* (2013.01); *G01S 5/0263* (2013.01); *G01S 19/42* (2013.01);
  *G05D 1/0055* (2013.01); *G05D 1/0088* (2013.01); *G08G 1/161* (2013.01); *H04L 9/3226* (2013.01);
  (Continued)

(58) Field of Classification Search
  CPC ....... H04W 12/06; H04W 4/46; H04W 4/023; G01S 5/0263; G01S 5/0072; G01S 19/42; G01S 5/00; H04L 9/3226; H04L 2209/805; H04L 63/107; H04L 2209/84; H04L 67/12; G05D 1/0055; G05D 1/0088; G05D 2201/0213; G08G 1/161; B60W 2550/408
  See application file for complete search history.

(56) References Cited

U.S. PATENT DOCUMENTS 8,712,056 B2 * 4/2014 Hall ...................... H04L 9/0822
                                                         380/273
8,955,129 B2   2/2015 Cao et al.
(Continued)

FOREIGN PATENT DOCUMENTS

JP      2008-275419      11/2008

OTHER PUBLICATIONS

Yan, G., Olariu, S. and Weigle, M.C., 2008. Providing VANET security through active position detection. Computer communications, 31(12), pp. 2883-2897. (Year: 2008).*

(Continued)

*Primary Examiner* — James R Turchen
(74) *Attorney, Agent, or Firm* — Nixon & Vanderhye P.C.

(57) ABSTRACT

A method by which a first vehicle authenticates a second vehicle using a plurality of communication schemes and a vehicle capable of performing the method are disclosed.

20 Claims, 16 Drawing Sheets

(51) Int. Cl.
*G08G 1/16* (2006.01)
*G01S 5/00* (2006.01)
*G01S 19/42* (2010.01)
*H04L 9/32* (2006.01)
*G01S 5/02* (2010.01)
*H04L 29/08* (2006.01)
*H04W 4/02* (2018.01)
*H04L 29/06* (2006.01)
*H04W 4/46* (2018.01)

(52) U.S. Cl.
CPC . *B60W 2556/65* (2020.02); *G05D 2201/0213* (2013.01); *H04L 63/107* (2013.01); *H04L 67/12* (2013.01); *H04L 2209/805* (2013.01); *H04L 2209/84* (2013.01); *H04W 4/023* (2013.01); *H04W 4/46* (2018.02)

(56) References Cited

U.S. PATENT DOCUMENTS

| | | | | |
|---|---|---|---|---|
| 9,344,856 | B2* | 5/2016 | Zhang | H04W 4/90 |
| 9,432,197 | B2* | 8/2016 | Naganuma | G06F 21/35 |
| 9,450,937 | B2 | 9/2016 | Mabuchi | |
| 9,495,870 | B2* | 11/2016 | Jana | H04W 4/023 |
| 9,716,980 | B1* | 7/2017 | Thiagarajan | G01S 1/74 |
| 9,805,597 | B2* | 10/2017 | Karacan | G08G 1/163 |
| 2006/0133289 | A1* | 6/2006 | Golle | H04L 63/0492 |
| | | | | 370/252 |
| 2008/0316052 | A1* | 12/2008 | Ruffini | H04W 28/18 |
| | | | | 340/901 |
| 2009/0265133 | A1* | 10/2009 | Baek | G01S 5/0294 |
| | | | | 702/150 |
| 2010/0081452 | A1* | 4/2010 | Guo | H04H 60/54 |
| | | | | 455/456.1 |
| 2010/0156660 | A1* | 6/2010 | Lee | G01S 13/82 |
| | | | | 340/8.1 |
| 2012/0290198 | A1* | 11/2012 | Firl | G08G 1/0112 |
| | | | | 701/117 |
| 2015/0052352 | A1* | 2/2015 | Dolev | H04W 12/06 |
| | | | | 713/156 |
| 2016/0231415 | A1* | 8/2016 | Liao | G01C 21/165 |
| 2017/0132477 | A1* | 5/2017 | Kim | G06K 9/325 |
| 2019/0101612 | A1* | 4/2019 | Hsiao | G01S 3/808 |

OTHER PUBLICATIONS

Leinmuller, T., Schoch, E. and Kargl, F., 2006. Position verification approaches for vehicular ad hoc networks. IEEE Wireless Communications, 13(5), pp. 16-21. (Year: 2006).*

Yan, G., Bista, B.B., Rawat, D.B. and Shaner, E.F., Oct. 2011. General active position detectors protect VANET security. In 2011 International Conference on Broadband and Wireless Computing, Communication and Applications (pp. 11-17). IEEE. (Year: 2011).*

Hao, Y., Tang, J. and Cheng, Y., Dec. 2011. Cooperative sybil attack detection for position based applications in privacy preserved VANETs. In 2011 IEEE Global Telecommunications Conference—GLOBECOM 2011 (pp. 1-5). IEEE. (Year: 2011).*

Agarwal, Y., Jain, K., Kumar, S. and Bhardwaj, G.N., Feb. 2016. TLST: Time of arrival based localization and smart tunnel concept in VANETs. In 2016 3rd International Conference on Signal Processing and Integrated Networks (SPIN) (pp. 763-768). IEEE. (Year: 2016).*

Xiao, B., Yu, B. and Gao, C., Sep. 2006. Detection and localization of sybil nodes in VANETs. In Proceedings of the 2006 workshop on Dependability issues in wireless ad hoc networks and sensor networks (pp. 1-8). ACM. (Year: 2006).*

Wen, M., Li, H., Zheng, Y.F. and Chen, K.F., 2008. TDOA-based Sybil attack detection scheme for wireless sensor networks. Journal of Shanghai University (English Edition), 12(1), pp. 66-70. (Year: 2008).*

* cited by examiner

FIG. 12

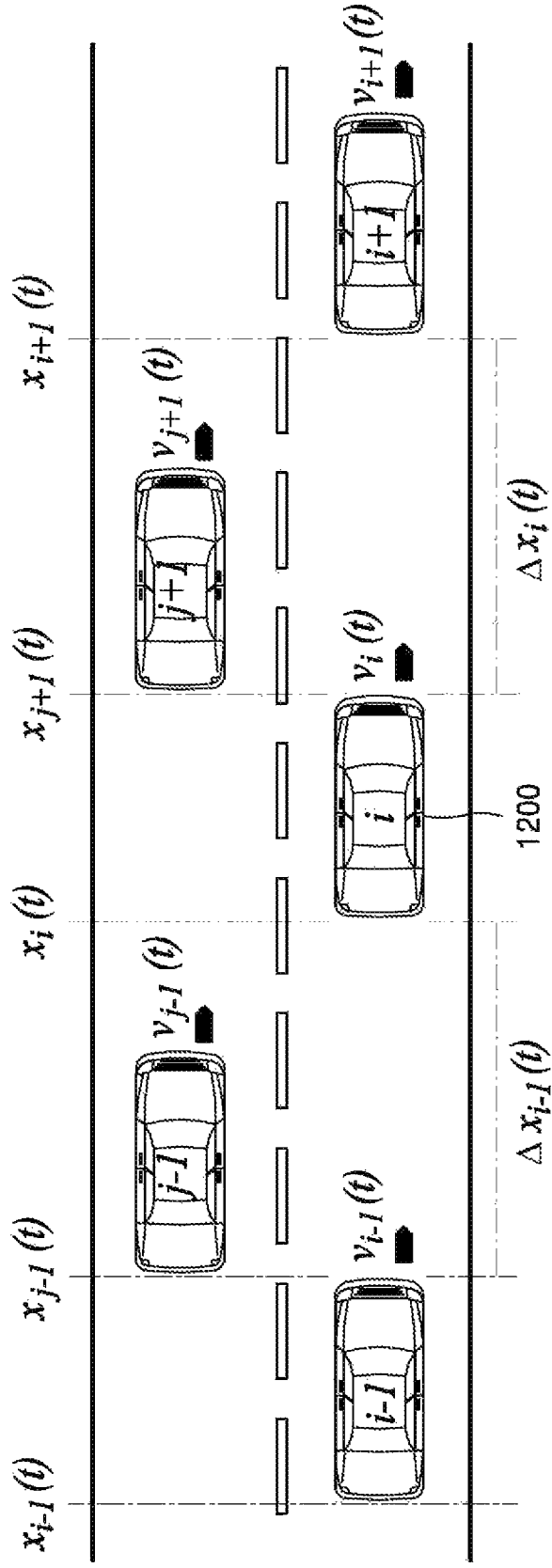

$v_j(t)$ : DRIVING SPEED OF VEHICLE j (m/sec)
$\Delta x_{min}$ : MINIMUM BUMP-TO-BUMP DISTANCE (meter)
$\delta$ : DESIRED DYNAMIC DISTANCE (meter)
$max_a$ : MAXIMUM ACCELERATION OF VEHICLE
$max_b$ : MAXIMUM DECELERATION OF VEHICLE $\Delta x_{min} = v_j(t) \cdot 1 second$
$\delta = \Delta x_{min} \cdot 2$ The following events will decrease the vehicle i's Credential Level in every observation period P

- $V_i(t)$ exceeds $V_{min}, V_{max}$
- Bumper_to_bumper distance < $\delta$
- Observed acceleration > $max_a$
- Observed acceleration > $max_b$
- reported position is outside of the road
- Observed vehicle ignores stop, traffic signal

FIG. 14

| Security metric | | |
|---|---|---|
| RELIABILITY LEVEL (1410) | DEFINITION (1420) | STATE (1430) |
| 8 ~ 10 | trustworthy | NORMAL |
| 6 ~ 8 | Fair | NORMAL |
| 4 ~ 6 | Suspicious | ABNORMAL |
| 2 ~ 4 | Poor | ABNORMAL |
| 0 ~ 2 | Blacklist | ABNORMAL |

1400

METHOD OF AUTHENTICATING EXTERNAL VEHICLE AND VEHICLE CAPABLE OF PERFORMING SAME

CROSS-REFERENCE TO RELATED APPLICATIONS

This application is based on and claims priority under 35 U.S.C. § 119 to U.S. Provisional Application No. 62/412,384, filed on Oct. 25, 2016, in the US Patent and Trademark Office and Korean Patent Application No. 10-2017-0094317, filed on Jul. 25, 2017, in the Korean Intellectual Property Office, the disclosures of which are incorporated by reference herein in their entireties.

BACKGROUND

1. Field

The present disclosure relates generally to a method of authenticating an external vehicle using a plurality of communication channels and a vehicle capable of performing the same.

2. Description of Related Art

Along with the high amount of interest in autonomous vehicles, techniques of enabling autonomous driving have increasingly received attention. In order for a vehicle to automatically move without a driver's operation, (1) a technique of recognizing an external environment of the vehicle, (2) a technique of deciding an operation, such as acceleration, stopping, or turning, and determining a driving path, by integrating recognized information, (3) a technique of controlling a motion of the vehicle using determined information, and the like are needed. For autonomous driving, all the techniques are organically combined, but the technique of recognizing an external environment of a vehicle has gradually become more significant because recognizing an external environment is the first element for the autonomous driving, and simultaneous merging of electrical and electronic technology and information technology (IT) are needed to recognize the external environment.

The technique of recognizing an external environment may be largely classified into two techniques, a sensor-based recognition technique and a connection-based recognition technique. Examples of sensors mounted on a vehicle for autonomous driving are an ultrasonic sensor, a camera, a radio detection and ranging (RADAR) sensor, and a light detection and ranging (LIDAR) sensor, and these sensors are mounted on the vehicle to detect an external environment and topography of the vehicle alone or with other sensors and to provide information to a driver and the vehicle.

The connection-based recognition technique for autonomous driving includes V2X and a precise positioning technique. V2X is an abbreviation of 'vehicle to something' and includes vehicle to infrastructure (V2I) for communicating with infrastructure, vehicle to pedestrian (V2P) for communicating with a pedestrian, and the like. V2X indicates a wireless communication technique of connecting a running vehicle with neighboring vehicles, traffic infrastructures, and pedestrians. V2X may transmit and receive information such as a position, a distance, and a speed between vehicles through a connected communication network and provide surrounding traffic information and information such as positions of pedestrians to a vehicle.

Meanwhile, a security problem which has recently become an important issue may be an obstacle in the spread of the connection-based recognition technique. Although there is currently no report of hacking damage with respect to a driver's actual driving situation, there may be a high possibility of the occurrence of damage caused by hacking when a frequency in which a vehicle accesses a network increases. Therefore, there is a need for expanding security-related techniques such as various hacking prevention techniques.

SUMMARY

A method and a vehicle for preventing and/or reducing a malicious operation with respect to an external vehicle or its position by authenticating the external vehicle through a plurality of communication channels are provided.

A method and a vehicle for determining the reliability of a neighboring vehicle or determining whether the neighboring vehicle is a normal vehicle, using driving information of the neighboring vehicle are provided.

Additional example aspects will be set forth in part in the description which follows and, in part, will be apparent from the description.

According to an aspect of an example embodiment, a method by which a first vehicle authenticates a second vehicle includes: receiving a first packet including position information of the second vehicle and first identity information from the second vehicle through a first communication scheme; receiving a second packet including the first identity information from the second vehicle through a second communication scheme different from the first communication scheme; acquiring first distance information about a distance between the first vehicle and the second vehicle based on the position information of the second vehicle; acquiring second distance information about a distance between the first vehicle and the second vehicle based on an interval between a first time point when the first packet is received and a second time point when the second packet is received and a transmission speed of the second communication scheme; and authenticating the second vehicle based on the first distance information and the second distance information.

According to an aspect of another example embodiment, a first vehicle includes: a first communication interface comprising communication circuitry configured to receive a first packet including position information of a second vehicle and first identity information from the second vehicle through a first communication scheme; a second communication interface comprising communication circuitry configured to receive a second packet including the first identity information from the second vehicle through a second communication scheme different from the first communication scheme; and a processor configured to acquire first distance information about a distance between the first vehicle and the second vehicle based on the position information of the second vehicle, to acquire second distance information about a distance between the first vehicle and the second vehicle based on an interval between a first time point when the first packet is received and a second time point when the second packet is received and a transmission speed of the second communication scheme, and to authenticate the second vehicle based on the first distance information and the second distance information.

According to an aspect of another example embodiment, a computer program product including a non-transitory computer-readable storage medium including instructions, which when executed by a processor, causes a first vehicle to be configured to: receive a first packet including position information of a second vehicle and first identity information from the second vehicle through a first communication scheme; to receive a second packet including the first identity information from the second vehicle through a second communication scheme different from the first communication scheme; acquire first distance information about a distance between the first vehicle and the second vehicle based on the position information of the second vehicle; acquire, by the first vehicle, second distance information about a distance between the first vehicle and the second vehicle based on an interval between a first time point when the first packet is received and a second time point when the second packet is received and a transmission speed of the second communication scheme; and authenticate the second vehicle based on the first distance information and the second distance information.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 12 is a diagram illustrating an example algorithm for acquiring driving information of a vehicle based on context information, according to an example embodiment;

FIG. 14 is a diagram illustrating an example security table according to an example embodiment;

DETAILED DESCRIPTION

Figure 1:
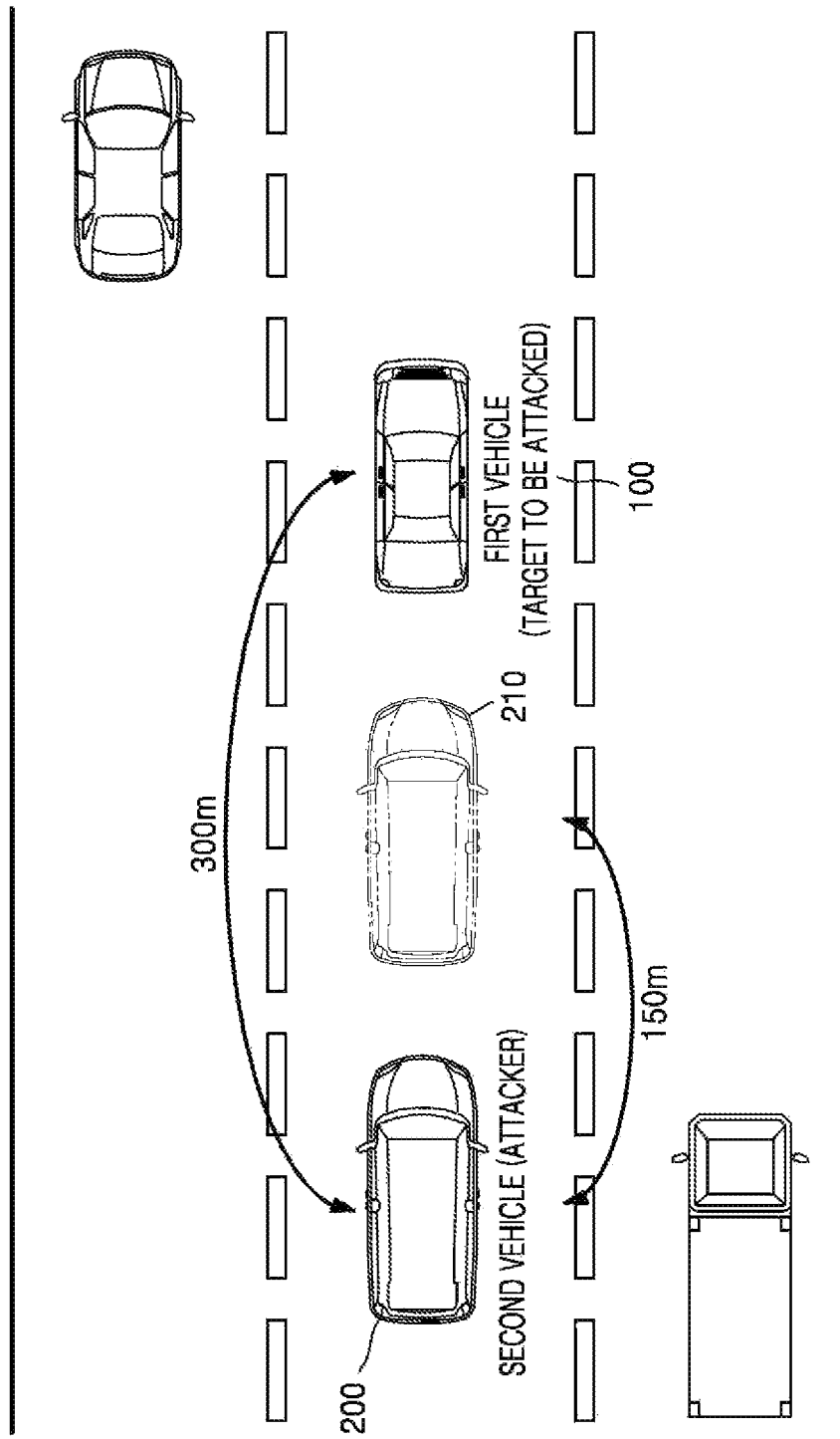
FIG. 1 is a diagram illustrating an example vehicle-to-vehicle communication system, according to an example embodiment.

The terms used in the disclosure will be schematically described, and then, the various disclosed example embodiments will be described in greater detail.

The terms used in this disclosure are those general terms currently widely used in the art, but the terms may vary according to the intention of those of ordinary skill in the art, precedents, or new technology in the art. Also, specified terms may be arbitrarily selected, and in this case, the detailed meaning thereof will be described in the detailed description. Thus, the terms used in the specification should be understood not as simple names but based on the meaning of the terms and the overall description.

Throughout the disclosure, it will also be understood that when a component "includes" an element, unless there is another conflicting description, it should be understood that the component does not exclude another element but may further include another element. In addition, terms such as " . . . unit", " . . . module", or the like may refer, for example, to units that perform at least one function or operation, and the units may be implemented as hardware or software or as a combination of hardware and software.

Throughout the disclosure, the term "communication scheme" may refer, for example, to a communication scheme through a certain communication standard, a certain frequency band, a certain protocol, or a certain channel, or the like, but is not limited thereto. For example, and without limitation, the communication scheme may include a communication scheme through wireless local area network (WLAN (Wi-Fi)), Bluetooth, Bluetooth low energy (BLE), Wi-Fi Direct (WFD), ultra-wideband (UWB), near field communication (NFC), Ant+, ZigBee, third generation (3G), fourth generation (4G), long term evolution (LTE), or ultrasound, an infrared data association (IrDA) communication scheme, a communication scheme using a sound, or the like but is not limited thereto.

Reference will now be made in greater detail to various example embodiments, examples of which are illustrated in the accompanying drawings, wherein like reference numerals refer to like elements throughout. In this regard, the present example embodiments may have different forms and should not be understood as being limited to the descriptions set forth herein. Accordingly, the various example embodiments are merely described below, by referring to the figures, to explain various example aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example vehicle-to-vehicle communication system, according to an example embodiment.

The communication system according to an embodiment may include a plurality of vehicles. In this case, the plurality of vehicles may include running vehicles, stopped vehicles, parked vehicles, or the like but are not limited thereto.

The plurality of vehicles may exchange information with each other. For example, each of the plurality of vehicles may broadcast or advertise a packet during a certain time period using a vehicle to something (V2X) technique (e.g., dedicated short-range communication (DSRC) or wireless access in vehicular environments (WAVE), or the like).

DSRC may refer, for example, to dedicated wireless mobile communication for vehicles and is one example manner of communication for providing an intelligent transport system (ITS) service. DSRC is currently used for communication modules of an automatic toll collection system all over the world.

WAVE may refer, for example, to a communication scheme enabling a next-generation ITS. WAVE is for an ITS specified to provide a communication service in an environment in which a vehicle is traveling at a high speed. WAVE includes Institute of Electrical and Electronics Engineers (IEEE) 802.11p and IEEE 1609x standards, but is not limited thereto.

A packet broadcasted from each of the plurality of vehicles may include position information of a corresponding vehicle. If an attacker maliciously fabricates position information included in a packet, at least one vehicle may incorrectly detect the existence of a neighboring vehicle or a position of the neighboring vehicle. For example, even though a second vehicle 200 is located 300 m behind a first vehicle 100, the attacker may generate a fake (e.g., phantom) vehicle 210 such that the first vehicle 100 incorrectly determines that the second vehicle 200 is located 150 m behind the first vehicle 100. In this case, the first vehicle 100 may not detect that the first vehicle 100 has received a Sybil attack and may mistake data transmitted from the fake vehicle 210 as being authentic.

The Sybil attack may refer, for example, to an attack in which an attack node threatens a network by creating a number of fake nodes. A fake node may transmit fake data to a different node such that the different node performs a meaningful determination based on the fake data.

Therefore, to improve safety between autonomous vehicles, a system for detecting maliciously fabricated fake information or a fake vehicle is necessary. Hereinafter, a method by which the first vehicle 100 authenticates the second vehicle 200 using a plurality of communication channels having different transmission speeds will be described in greater detail with reference to FIG. 2.

For convenience of description, hereinafter, a vehicle configured to authenticate an external vehicle is referred to as the first vehicle 100, and a vehicle to be authenticated is referred to as the second vehicle 200.

Figure 2:
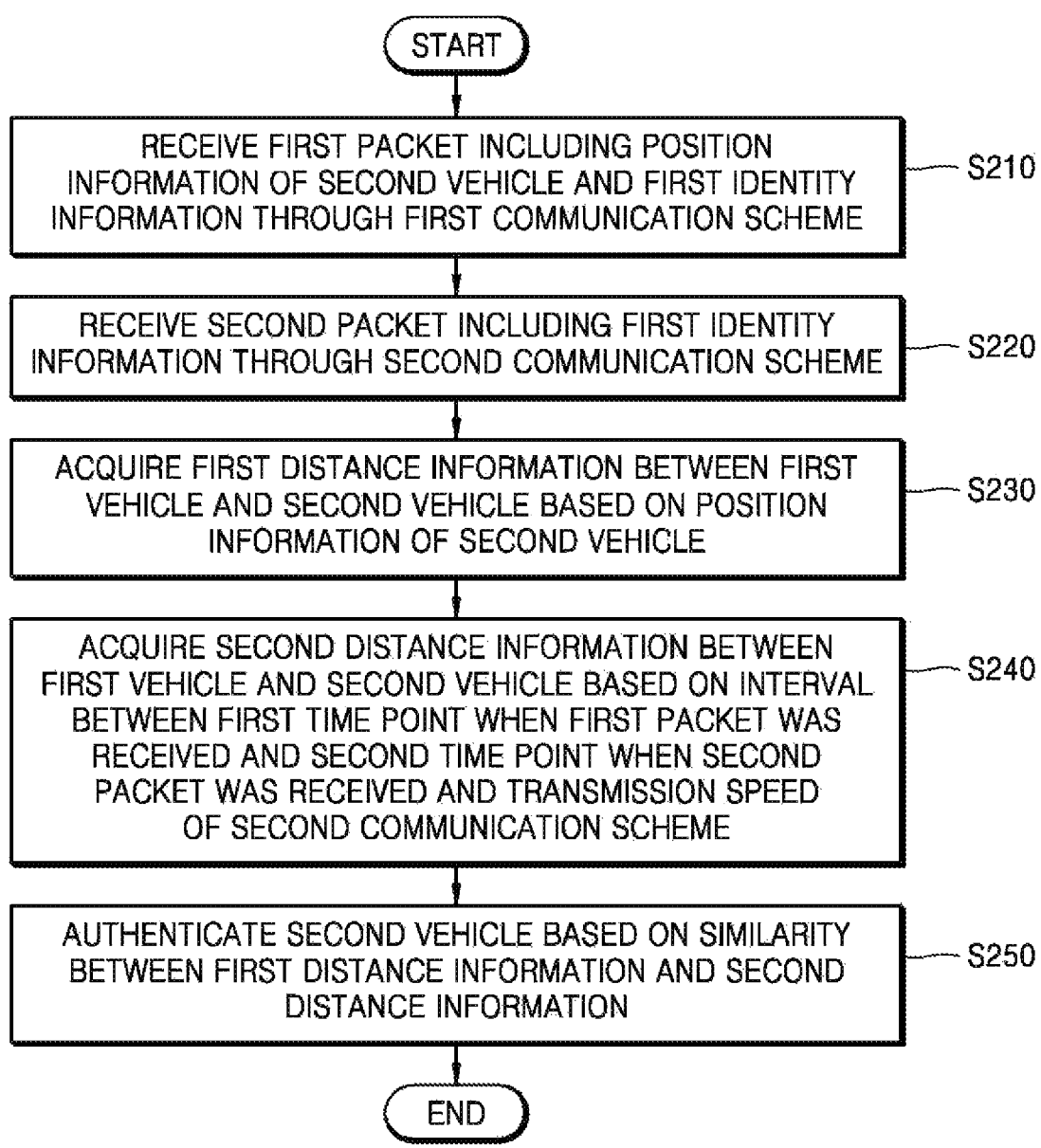
FIG. 2 is a flowchart illustrating any example method by which a first vehicle authenticates a second vehicle, according to an example embodiment.

FIG. 2 is a flowchart illustrating an example method by which the first vehicle 100 authenticates the second vehicle 200, according to an example embodiment.

In operation S210, the first vehicle 100 may receive a first packet including position information of the second vehicle 200 and first identity information from the second vehicle 200 through a first communication scheme.

According to an embodiment, the first communication scheme may, for example, be a communication scheme for vehicle-to-vehicle communication. The first communication scheme may include, for example, and without limitation, a communication scheme using a radio frequency. For example, the first communication scheme may include at least one of WLAN (Wi-Fi), 3G, 4G, LTE, Bluetooth, Zigbee, WFD, UWB, IrDA, BLE, NFC, and Ant+ communication schemes, or the like, but is not limited thereto.

According to an embodiment, the first packet may be broadcast from the second vehicle 200 during a certain period and include position information of the second vehicle 200 and the first identity information.

The first identity information may be information for confirming that the first packet broadcast through the first communication scheme and a second packet broadcast through a second communication scheme are one pair. For example, the first identity information may be unique identity information, for example, may include a random value, information indicating an origin (e.g., identity information of the second vehicle 200), a timestamp, or the like, but is not limited thereto.

The position information of the second vehicle 200 may, for example, include information about a position of the second vehicle 200 at a time point at which the first packet is broadcast. According to an embodiment, the second vehicle 200 may obtain a position of the second vehicle 200 by using a global positioning system (GPS) device, a precise positioning technique, or the like, but is not limited thereto. The precise positioning technique may, for example, include a differential GPS (DGPS) technique or a sensor fusion technique, or the like, but is not limited thereto. The DGPS technique is a technique of improving position precision using position compensation data transmitted from a reference station which knows an accurate position through existing GPS data and measurement. The sensor fusion technique is a technique of combining GPS data with data sensed by an in-vehicle acceleration sensor, gyro sensor, camera, or the like to measure a position in a shadow area, in which it is difficult to receive satellite signals, such as a tunnel, which is a limitation of a GPS technique.

According to an embodiment, the position information of the second vehicle 200 may include coordinate values indicating degrees of longitude and latitude. In addition, the position information of the second vehicle 200 may include information about a moving direction, a speed, an acceleration, or the like of the second vehicle 200, but is not limited thereto.

According to an embodiment, the first packet may further include time information (e.g., a timestamp), key data, and an electronic signature, or the like, but is not limited thereto. The key data may include both a public key (asymmetric key) and a secret key (symmetric key). The key data may include data to be used for encryption communication and may include data to be used when a channel for encryption communication is set. The key data may be generated through a pre-stored key calculation algorithm. The key calculation algorithm may include various algorithms such as ABS, Message-Digest algorithm 5 (MD5), and Bilinear Computational Diffie-Hellman (BCDH), but is not limited thereto. In addition, the key calculation algorithm will be apparent to those of ordinary skill in the art, and thus a detailed description thereof will be omitted. The first packet will be described below in greater detail with reference to FIG. 3.

In operation S220, the first vehicle 100 may receive a second packet including the first identity information from the second vehicle 200 through the second communication scheme.

According to an embodiment, the second packet may be transmitted (or broadcast or advertised) from the second vehicle 200 at the same time as the transmission of the first packet. However, since there exists a difference between a transmission speed of a data packet using the first communication scheme and a transmission speed of a data packet using the second communication scheme, a time point at which the first vehicle 100 receives the first packet may differ from a time point at which the first vehicle 100 receives the second packet.

According to an embodiment, the transmission speed of the first communication scheme may be faster than the transmission speed of the second communication scheme. In this case, the first vehicle 100 may first receive the first packet transmitted through the first communication scheme and then receive the second packet including the same identity information (e.g., the first identity information) as the first packet after a certain time.

According to an embodiment, the second packet may be smaller in size than the first packet because the second packet simply includes information for verifying information included in the first packet or a position of the second vehicle 200.

According to an embodiment, the second packet may include time information (e.g., a timestamp) and a unique arbitrary value (nonce) in addition to the first identity information, but is not limited thereto. For example, the second packet may include position information of the second vehicle 200 and/or an electronic signature. The second packet will be described below in greater detail with reference to FIG. 3.

According to an embodiment, the second communication scheme may include a communication scheme using ultrasonic waves. Since a moving speed of the ultrasonic waves is about 330 m/s, the communication scheme using ultrasonic waves may have a transmission speed that is slower than that of a communication scheme using a radio frequency. According to an embodiment, when the second communication scheme is a communication scheme using ultrasonic waves, the first vehicle 100 may sense the second packet using an ultrasonic sensor.

According to an embodiment, the second communication scheme may include a communication scheme of transmitting and receiving data using sound. For example, the second vehicle 200 may insert the second packet into a non-audible region of sound, music, or an announcement and broadcast the second packet-inserted sound, music, or announcement to the outside. When the second communication scheme is a communication scheme using sound, the first vehicle 100 may receive the second packet through a microphone.

According to an embodiment, the second communication scheme may be a communication scheme using directional sound. The directional sound may include sound having a waveform traveling only in a certain direction or sound of a certain frequency band.

In operation S230, the first vehicle 100 may acquire first distance information about a distance between the first vehicle 100 and the second vehicle 200 based on the position information of the second vehicle 200, which is included in the first packet.

According to an embodiment, the first distance information may include information about a relative position from the first vehicle 100 to the second vehicle 200 and/or include absolute position information of each of the first vehicle 100 and the second vehicle 200. In addition, the first distance information may include direction information (for example, information indicating that the second vehicle 200 is located in a southeast direction from the first vehicle 100).

According to an embodiment, the first vehicle 100 may acquire information (first information) about a distance between the first vehicle 100 and the second vehicle 200 (hereinafter, first distance) using the position information of the second vehicle 200, which is included in the first packet. For example, the first vehicle 100 may calculate the first distance by comparing a position value $(X_1, Y_1)$ of the second vehicle 200 at a specific time point when the first packet was transmitted and a position value $(X_2, Y_2)$ of the first vehicle 100 at the specific time point. In this case, the first vehicle 100 may calculate a first directional vector between the first vehicle 100 and the second vehicle 200.

According to an embodiment, when the transmission speed of the first packet is fast, a difference between a transmission time point when the second vehicle 200 transmitted the first packet and a reception time point when the first vehicle 100 received the first packet is not large, and thus the first vehicle 100 may calculate the first distance (or first directional vector) by comparing a position value (e.g., the position value of the second vehicle 200, which is included in the first packet) of the second vehicle 200 at the transmission time point and a position value of the first vehicle 100 at the reception time point.

According to an embodiment, when an electronic signature is included in the first packet, the first vehicle 100 may first verify the first packet before calculating the first distance between the first vehicle 100 and the second vehicle 200.

In operation S240, the first vehicle 100 may acquire second distance information about a distance between the first vehicle 100 and the second vehicle 200 based on an interval between a first time point when the first packet was received and a second time point when the second packet was received and the transmission speed of the second communication scheme.

According to an embodiment, when the transmission speed of the first communication scheme is faster than the transmission speed of the second communication scheme, the first vehicle 100 may first receive the first packet and then receive the second packet after a certain time. In this case, the first vehicle 100 may measure the interval between the first time point when the first packet was received and the second time point when the second packet was received and previously obtain the transmission speed of the second communication scheme, and thus the first vehicle 100 may calculate information (second distance information) about a distance between the first vehicle 100 and the second vehicle 200 (hereinafter, second distance) using the measured interval between the first time point and the second time point and the transmission speed of the second communication scheme. For example, when the interval between the first time point and the second time point is one second, and the transmission speed of the second communication scheme is 300 m/s, the first vehicle 100 may determine the second distance between the first vehicle 100 and the second vehicle 200 as 300 m.

The transmission speed of the second communication scheme may, for example, be one of a mean transmission speed, a minimum transmission speed, and a maximum transmission speed but is not limited thereto. For example, when the second communication scheme is a communication scheme using ultrasonic waves, the transmission speed of the second communication scheme may be affected by a temperature and humidity, and thus the transmission speed of the second communication scheme may rely on a temperature and humidity at a time point when the second packet is transmitted and received.

According to an embodiment, the first vehicle 100 may acquire the second distance information between the first vehicle 100 and the second vehicle 200 by taking into account at least one of the transmission speed of the first communication scheme and a moving speed of the first vehicle 100. For example, when a difference between transmission and reception time points of the first packet is 0.1 seconds, and a difference between transmission and reception time points of the second packet is 1.1 seconds, a difference between the reception time points of the first and second packets may be one second. Therefore, the first vehicle 100 may calculate the second distance as 300 m by multiplying one second by 300 m/s that is the transmission speed of the second communication scheme. However, when taking into account the transmission speed of the first communication scheme, the first vehicle 100 may know that 0.1 seconds were taken to receive the first packet and know that a difference between the transmission and reception time points of the second packet is 1.1 seconds. Therefore, the first vehicle 100 may calculate the second distance as 330 m by multiplying 1.1 seconds by 300 m/s that is the transmission speed of the second communication scheme. In addition, the first vehicle 100 may calculate a moving distance of the first vehicle 100 from a time point when the second packet was transmitted to a time point when the second packet was received by multiplying a moving speed of the first vehicle 100 by one second when one second was taken to receive the second packet. In addition, the first vehicle 100 may acquire the second distance information between the first vehicle 100 and the second vehicle 200 by taking into account the moving distance of the first vehicle 100.

In operation S250, the first vehicle 100 may authenticate the second vehicle 200 based on a similarity between the first distance information and the second distance information, or simply based on the first and second distance information.

According to an embodiment, the first vehicle 100 may determine the second vehicle 200 as an abnormal (e.g., fake) vehicle when the similarity between the first distance information and the second distance information is less than a threshold value. For example, when the first distance calculated based on the position information of the second vehicle 200, which is included in the first packet, is 150 m, and the second distance measured based on the second packet is 300 m, the first vehicle 100 may determine the second vehicle 200 as an abnormal vehicle. In this case, even though the second vehicle 200 is actually located 300 m behind the first vehicle 100, the first vehicle 100 may determine that the first packet was fabricated such that the first vehicle 100 recognizes that the second vehicle 200 is located 150 m behind the first vehicle 100.

The abnormal vehicle may indicate a vehicle determined that position information of a corresponding vehicle has been fabricated or a vehicle deviated from a common-sense driving pattern. In the present disclosure, the abnormal vehicle may be represented as an attacking vehicle (attacker), a fake vehicle, or the like.

According to an embodiment, the first vehicle 100 may determine the second vehicle 200 as a normal vehicle when the similarity between the first distance information and the second distance information is greater than or equal to the threshold value. For example, when the first distance calculated based on the position information of the second vehicle 200, which is included in the first packet, is 150 m, and the second distance measured based on the second packet is also 150 m, the first vehicle 100 may authenticate the second vehicle 200 as a normal vehicle. In this case, the first vehicle 100 may recognize that the second vehicle 200 located 150 m behind the first vehicle 100.

According to an embodiment, the first vehicle 100 may periodically broadcast an authentication result of the second vehicle 200. For example, when the similarity between the first distance information and the second distance information is less than the threshold, the first vehicle 100 may broadcast a warning message indicating that the second vehicle 200 is an abnormal vehicle. In this case, according to an embodiment, the warning message may indicate that the first packet has been forged. On the other hand, when the similarity between the first distance information and the second distance information is greater than or equal to the threshold value, the first vehicle 100 may broadcast a message indicating that the second vehicle 200 is a normal vehicle.

According to an embodiment, when the second vehicle 200 is authenticated as a normal vehicle, the first vehicle 100 may also accept the first packet received from the second vehicle 200 thereafter. However, when the second vehicle 200 is authenticated as an abnormal vehicle, the first vehicle 100 may block, ignore, or reject the first packet received from the second vehicle 200 thereafter.

According to an embodiment, the first vehicle 100 may authenticate the second vehicle 200 by taking into account driving information of the second vehicle 200, information (or a warning message) about the second vehicle 200, which has been collected from a neighboring vehicle, or the like. A method by which the first vehicle 100 authenticates the second vehicle 200 by taking into account driving information of the second vehicle 200 will be described below in greater detail with reference to FIG. 11. In addition, a method by which the first vehicle 100 authenticates the second vehicle 200 by taking into account information about the second vehicle 200, which has been collected from a neighboring vehicle, will be described below in greater detail with reference to FIGS. 7 and 8.

According to an embodiment, the sequence of operations S210 to S250 may be changed. For example, the sequence of operations S220 and S230 may be changed.

Hereinafter, the first packet and the second packet having the same identity information and simultaneously transmitted from the second vehicle 200 will be described in greater detail.

Figure 3:
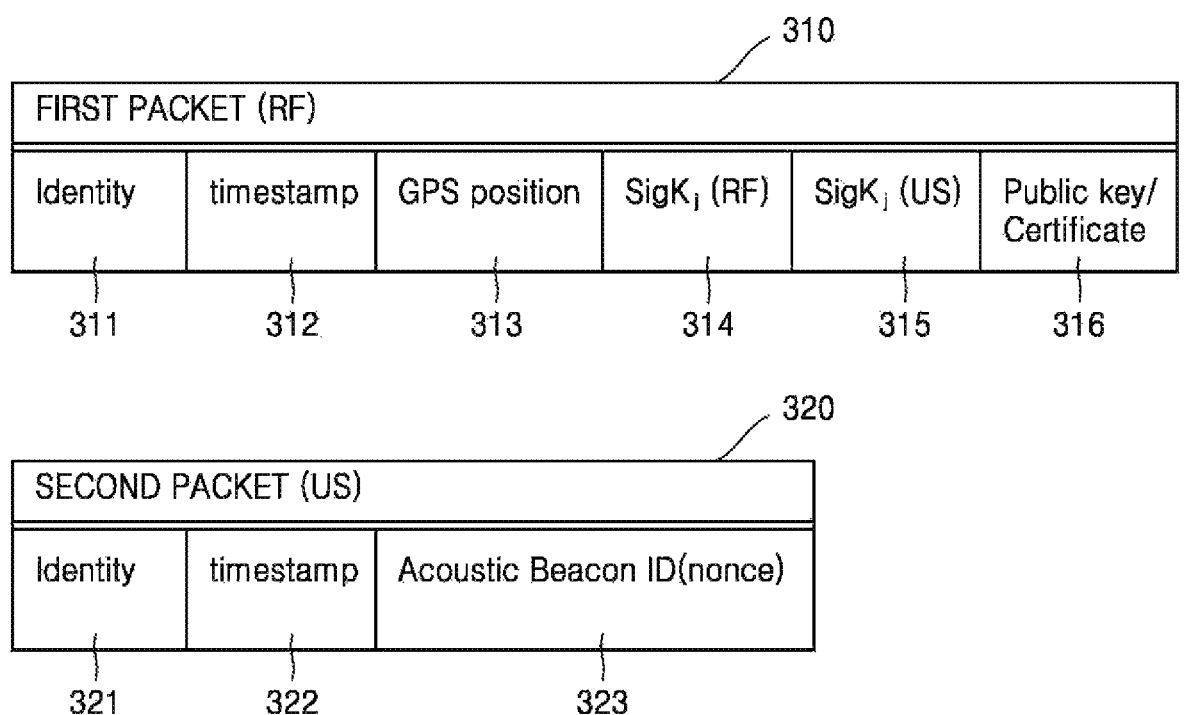
FIG. 3 is a diagram illustrating an example packet periodically broadcasted from a vehicle, according to an example embodiment.

FIG. 3 is a diagram illustrating an example packet periodically broadcast from a vehicle, according to an example embodiment. FIG. 3 illustrates a case in which the first packet is a radio frequency packet (hereinafter, RF packet) broadcast through an RF channel, and the second packet is an ultrasonic packet (hereinafter, US packet) broadcast through an ultrasonic communication channel.

According to an embodiment, the vehicle may broadcast a pair of an RF packet 310 and a US packet 320. In this case, a neighboring vehicle may first receive the RF packet 310 and then receive the US packet 320 after a certain time. If the neighboring vehicle receives the US packet 320 earlier than the RF packet 310 or cannot receive the US packet 320, the neighboring vehicle may doubt that the vehicle which has broadcast the RF packet 310 is an abnormal vehicle. Therefore, the US packet 320 may be used to verify position information included in the RF packet 310 and the vehicle which has broadcast the RF packet 310.

According to an embodiment, the RF packet 310 may include, for example, some or all of identity information 311, a timestamp 312, GPS position information 313, encryption data 314 related to the RF packet 310, encryption data 315 related to the US packet 320, and a public key/certificate 316, but is not limited thereto.

According to an embodiment, the encryption data 314 related to the RF packet 310 may be data obtained by encrypting a first hash value for the RF packet 310, which has been generated using a hash function (e.g., SHA1), with a private key of the second vehicle 200. When the encryption data 314 related to the RF packet 310 is attached to the RF packet 310, the first vehicle 100 may verify the RF packet 310 by comparing the first hash value decrypted using a public key and a second hash value directly generated using a hash function.

According to an embodiment, the encryption data 315 related to the US packet 320 may be data obtained by encrypting a third hash value for the US packet 320, which has been generated using a hash function (e.g., SHA1), with the private key of the second vehicle 200. When the encryption data 315 related to the US packet 320 is attached to the US packet 320, the first vehicle 100 may verify the US packet 320 by comparing the third hash value decrypted using a public key and a fourth hash value directly generated using a hash function.

The US packet 320 may be used to verify information included in the RF packet 310 or a position of the second vehicle 200 and may be smaller in size than the RF packet 310. For example, the US packet 320 may include identity information 321, a timestamp 322, and a unique arbitrary value (nonce) 323, but is not limited thereto. In this case, the identity information 321 included in the US packet 320 may be the same as the identity information 311 included in the RF packet 310.

According to an embodiment, besides the second vehicle 200, the first vehicle 100 may also periodically broadcast a first packet including position information of the first vehicle 100 and a paired second packet such that neighboring vehicles may authenticate a position of the first vehicle 100.

Since a communication range of the first communication scheme differs from a communication range of the second communication scheme, there may exist vehicles located at positions where both the first packet and the second packet are receivable and vehicles located at positions where only the first packet is received but the second packet cannot be received. Relative roles of vehicles will be described in greater detail below with reference to FIG. 4.

Figure 4:
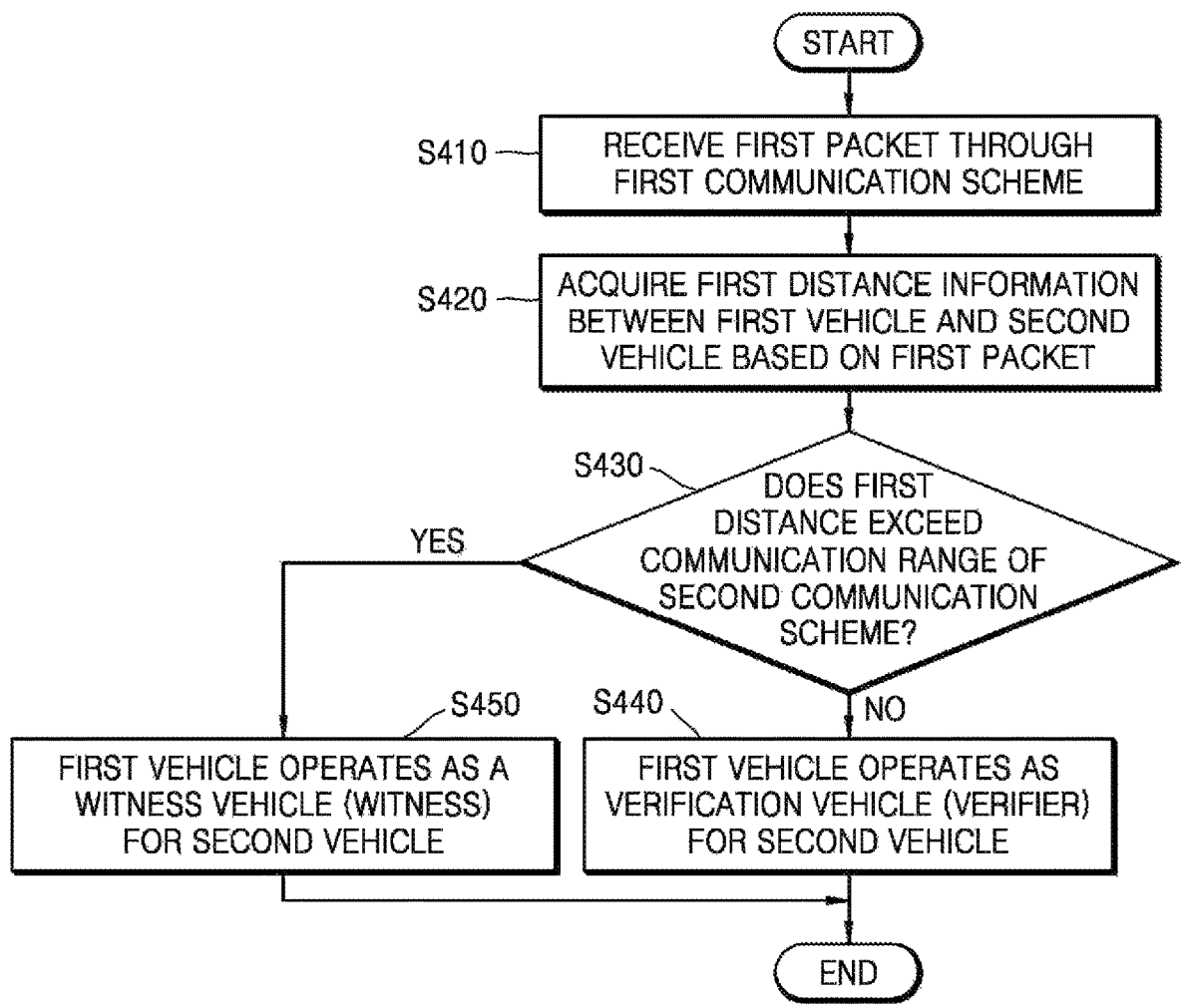
FIG. 4 is a flowchart illustrating an example method of deciding a verification vehicle and a witness vehicle, according to an example embodiment.

FIG. 4 is a flowchart illustrating an example method for deciding a verification vehicle and a witness vehicle, according to an example embodiment.

In operation S410, the first vehicle 100 may receive the first packet from the second vehicle 200 through the first communication scheme. The first packet may include the position information of the second vehicle 200 and first identity information. The first communication scheme may be a communication scheme using a radio frequency. Since operation S410 corresponds to operation S210 of FIG. 2, a detailed description thereof is not repeated here.

In operation S420, the first vehicle 100 may acquire the first distance information between the first vehicle 100 and the second vehicle 200 based on the first packet. For example, the first vehicle 100 may calculate (determine) the first distance between the first vehicle 100 and the second vehicle 200 using the position information of the second vehicle 200, which is included in the first packet. The first vehicle 100 may calculate the first distance by comparing a position value $(X_1, Y_1)$ of the second vehicle 200 at the first time point when the first packet was transmitted and a position value $(X_2, Y_2)$ of the first vehicle 100 at the first time point. When a transmission speed of the first packet is fast, the first vehicle 100 may calculate the first distance by comparing a position value $(X_1, Y_1)$ of the second vehicle 200 at the first time point when the first packet was transmitted and a position value $(X_2, Y_2)$ of the first vehicle 100 at the second time point when the first packet was received. Since operation S420 corresponds to operation S230 of FIG. 2, a detailed description thereof is not repeated here.

In operation S430, the first vehicle 100 may determine whether the first distance between the first vehicle 100 and the second vehicle 200 exceeds the communication range of the second communication scheme.

The communication range of the second communication scheme may be one of a maximum communication range, a minimum communication range, and a mean communication range, but is not limited thereto. The communication range of the second communication scheme may vary according to environmental conditions such as temperature and humidity. Therefore, the communication range of the second communication scheme may be determined taking into account the environment elements.

In operation S440, if the first distance between the first vehicle 100 and the second vehicle 200 is within the communication range of the second communication scheme, the first vehicle 100 may operate as a verification vehicle (verifier) for the second vehicle 200. For example, when the first distance between the first vehicle 100 and the second vehicle 200 is 100 m, and the communication range of the second communication scheme is 200 m, the first vehicle 100 may wait until the second packet including the same identity information as the identity information included in the first packet is received through the second communication scheme. In addition, the first vehicle 100 may verify a position (or existence) of the second vehicle based on an interval between a time point when the first packet was received and a time point when the second packet was received and the transmission speed of the second communication scheme.

A case in which the first vehicle 100 operates as a verifier for the second vehicle 200 will be described below in greater detail with reference to FIG. 6.

In operation S450, if the first distance between the first vehicle 100 and the second vehicle 200 exceeds the communication range of the second communication scheme, the first vehicle 100 may operate as a witness vehicle (witness) for the second vehicle 200. In this case, the first vehicle 100 cannot authenticate the second vehicle 200 only with the first packet and may authenticate the second vehicle 200 by further considering information collected from the outside. A method by which the first vehicle 100 operates as a witness will be described below in detail with reference to FIG. 15.

In present disclosure, a verifier for a specific vehicle may indicate a vehicle located at a position where both the first packet transmitted from the specific vehicle according to the first communication scheme and the second packet transmitted according to the second communication scheme are receivable. In addition, a witness for the specific vehicle may indicate a vehicle located at a position where the first packet transmitted from the specific vehicle according to the first communication scheme is receivable, but located at a position where the second packet transmitted according to the second communication scheme cannot be received. The verifier and the witness will be described in greater detail below with reference to FIG. 5.

Figure 5:
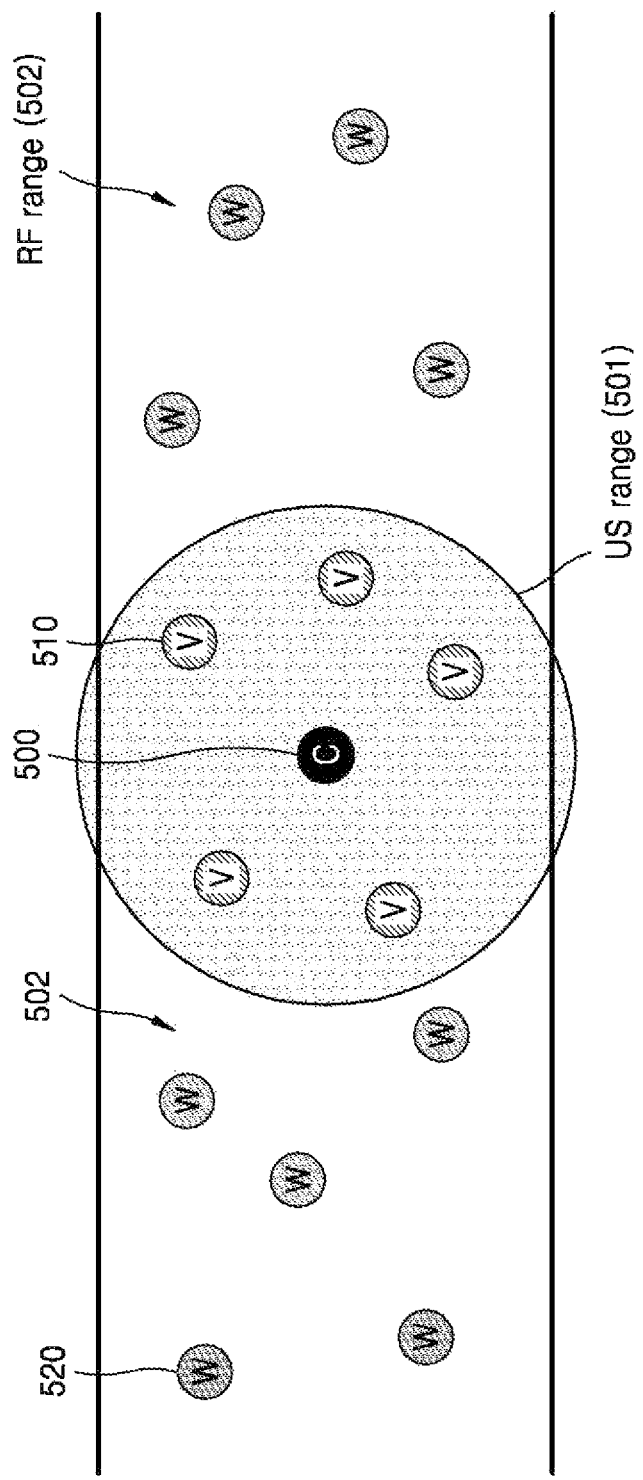
FIG. 5 is a diagram illustrating an example verification vehicle and a witness vehicle based on a distance between vehicles and a communication range, according to an example embodiment.

FIG. 5 is a diagram illustrating an example verifier and a witness based on a distance between vehicles and a communication range, according to an example embodiment. In FIG. 5, it is assumed that the first communication scheme is an RF communication scheme, and the second communication scheme is a US communication scheme for ease of description.

Referring to FIG. 5, verifiers (V) for a specific vehicle 500 may be vehicles 510 located in a region 501 in which a US packet is receivable out of a region 502 in which an RF packet broadcasted from the specific vehicle 500 is receivable. Therefore, the verifiers for a specific vehicle 500 may verify a position of the specific vehicle 500 using one pair of an RF packet and a US packet, which include the same identity information.

Witnesses (W) for the specific vehicle 500 may be vehicles 520 which are not located in the region 501 in which a US packet is receivable but are located in the region 502 in which an RF packet broadcasted from the specific vehicle 500 is receivable. Therefore, since the witnesses for the specific vehicle 500 cannot receive a US packet transmitted from the specific vehicle 500, it may be difficult for the witnesses to directly verify a position of the specific vehicle 500. However, the witnesses may indirectly verify a position of the specific vehicle 500. A method by which a witness indirectly verifies a position of the specific vehicle 500 will be described below in detail with reference to FIG. 15.

Figure 6:
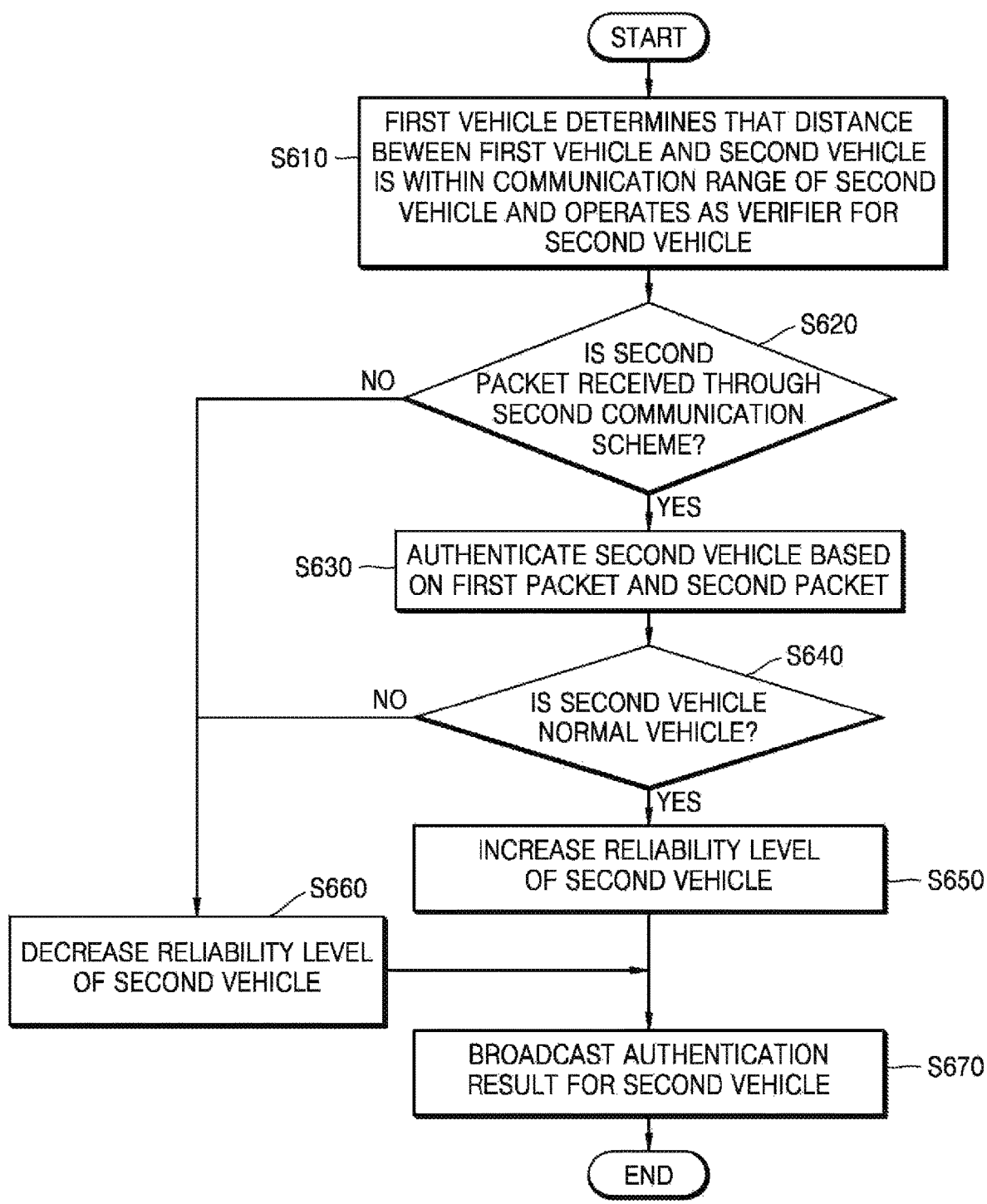
FIG. 6 is a flowchart illustrating an example method of operating a verification vehicle, according to an example embodiment.

FIG. 6 is a flowchart illustrating an example method of operating a verifier, according to an example embodiment.

In operation S610, the first vehicle 100 may determine that the first distance between the first vehicle 100 and the second vehicle 200 is within the communication range of the second communication scheme, based on the first packet received through the first communication scheme. For example, when the first distance between the first vehicle 100 and the second vehicle 200, which is calculated based on the first position information included in the first packet is 50 m, and the communication range of the second communication scheme is 100 m, the first vehicle 100 may determine that the first vehicle 100 is located within a distance at which the second packet broadcasted by the second vehicle 200 is receivable.

In operation S620, the first vehicle 100 may determine whether the second packet is received through the second communication scheme within a certain time. According to an embodiment, since the first vehicle 100 is located with the communication range of the second communication scheme of the second vehicle 200, the first vehicle 100 may wait for the second packet received through the second communication scheme.

In operation S630, if the second packet is received through the second communication scheme within the certain time, the first vehicle 100 may authenticate the second vehicle 200 based on the first packet and the second packet. For example, the first vehicle 100 may acquire the first distance information between the first vehicle 100 and the second vehicle 200 based on the position information of the second vehicle 200, which is included in the first packet, acquire the second distance information between the first vehicle 100 and the second vehicle 200 based on an interval between the first time point when the first packet was received and the second time point when the second packet was received and the transmission speed of the second communication scheme, and compare the first distance information and the second distance information to authenticate the second vehicle 200. If similarity between the first distance information and the second distance information is less than the threshold value, the first vehicle 100 may determine the second vehicle 200 as a normal vehicle. Since operation S630 corresponds to operations S230 to S250 of FIG. 2, a detailed description thereof is not repeated here.

In operations S640 and S650, if the second vehicle 200 is authenticated as a normal vehicle, the first vehicle 100 may adjust a level of reliability of the second vehicle 200 so that the level is increased. For example, the first vehicle 100 may increase the reliability of the second vehicle 200 by one level from a seventh level to an eighth level. The reliability of a vehicle will be described below in greater detail with reference to FIG. 14.

In operation S660, if the second packet is not received through the second communication scheme within the certain time, or the second vehicle 200 deviates from a range of a normal vehicle, the first vehicle 100 may adjust the level of the reliability of the second vehicle 200 so that the level is decreased. For example, the first vehicle 100 may adjust the level of the reliability of the second vehicle 200 so that the level is decreased by one level from the eighth level to the seventh level.

In operation S670, the first vehicle 100 may broadcast (or advertise) an authentication result for the second vehicle 200. According to an embodiment, the first vehicle 100 may broadcast the authentication result for the second vehicle 200 through the first communication scheme (e.g., a communication scheme using a radio frequency) but is not limited thereto. For example, the first vehicle 100 may broadcast the authentication result for the second vehicle 200 through a communication scheme other than the first communication scheme.

According to an embodiment, an attacking vehicle may not broadcast both the first packet and the second packet but intentionally broadcast the second packet of which a transmission speed is slow earlier than the first packet in an effort to deceive the other vehicles about a position of the attacking vehicle. Hereinafter, a method of detecting a case in which an attacking vehicle fabricates a transmission time point of a packet will be described in greater detail.

Figure 7:
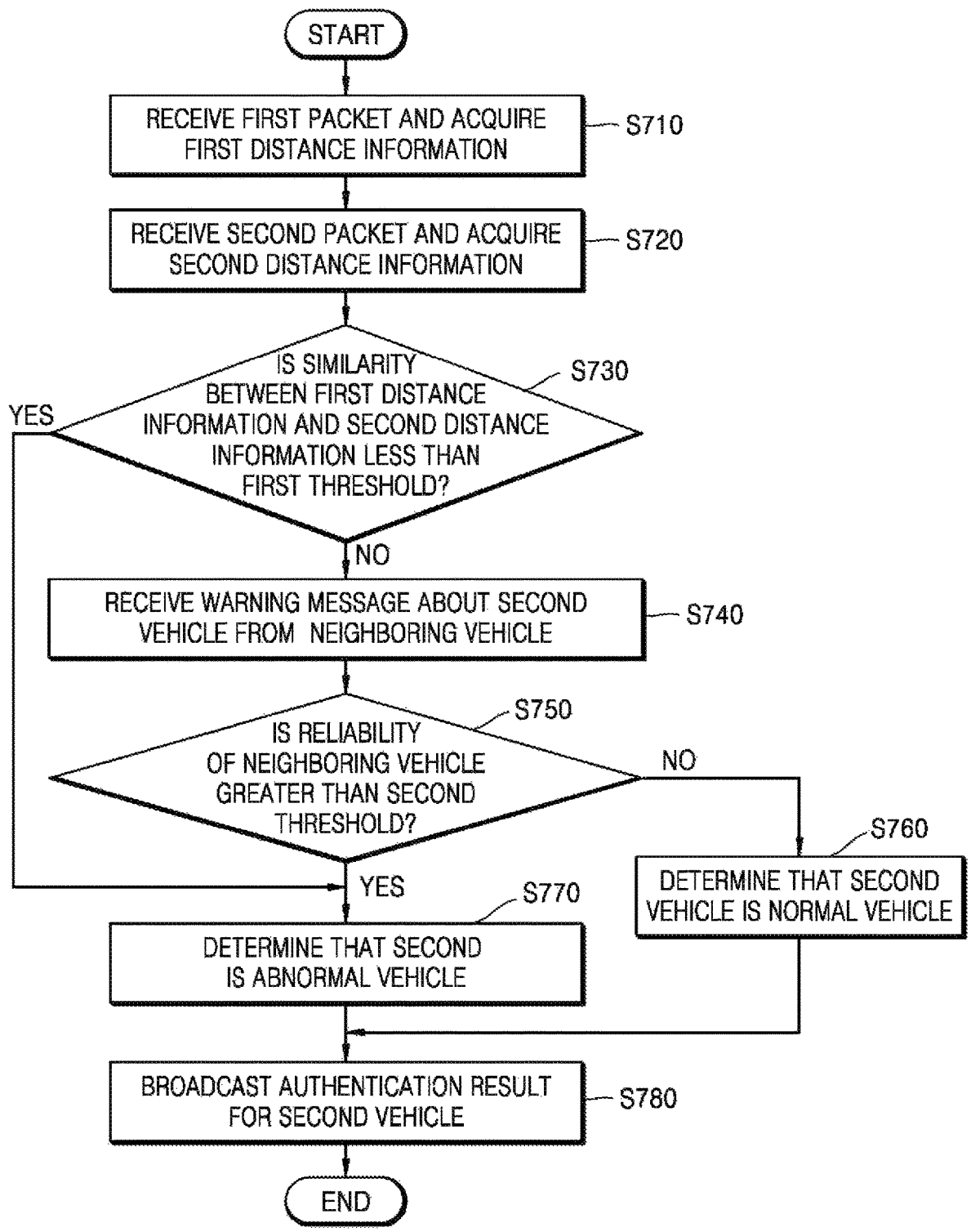
FIG. 7 is a flowchart illustrating an example method of authenticating a second vehicle based on a warning message received from a neighboring vehicle, according to an example embodiment.

FIG. 7 is a flowchart illustrating an example method of authenticating the second vehicle 200 based on a warning message received from a neighboring vehicle, according to an example embodiment.

In operation S710, the first vehicle 100 may receive the first packet including position information of the second vehicle 200 and the first identity information from the second vehicle 200 through the first communication scheme and acquire the first distance information. For example, the first vehicle 100 may acquire information (first information) about a distance between the first vehicle 100 and the second vehicle 200 (first distance) by comparing a position value $(X_1, Y_1)$ of the second vehicle 200 at a specific time point when the first packet was transmitted and a position value $(X_2, Y_2)$ of the first vehicle 100 at the specific time point. Since operation S710 corresponds to operations S210 and S230 of FIG. 2, a detailed description thereof is not repeated here.

In operation S720, the first vehicle 100 may receive the second packet including the first identity information from the second vehicle 200 through the second communication scheme and acquire the second distance information. For example, the first vehicle 100 may measure the interval between the first time point when the first packet was received and the second time point when the second packet was received and previously obtain the transmission speed of the second communication scheme, and thus the first vehicle 100 may calculate information (second distance information) about a distance between the first vehicle 100 and the second vehicle 200 (hereinafter, second distance)

using the measured interval between the first time point and the second time point and the transmission speed of the second communication scheme. Since operation S720 corresponds to operations S220 and S240 of FIG. 2, a detailed description thereof is not repeated here.

In operation S730, the first vehicle 100 may determine whether the similarity between the first distance information and the second distance information is less than a first threshold (or whether a difference between the first distance and the second distance is greater than or equal to the threshold). For example, when the first distance is 100 m and the second distance is 200 m, the first vehicle 100 may determine that the similarity between the first distance information and the second distance information is less than the first threshold (e.g., 90%). However, when the first distance is 100 m and the second distance is 102 m, the first vehicle 100 may determine that the similarity between the first distance information and the second distance information is greater than or equal to the first threshold (e.g., 90%).

In operation S740, the first vehicle 100 may receive a warning message about the second vehicle 200 from a neighboring vehicle if the similarity between the first distance information and the second distance information is not less than the first threshold.

According to an embodiment, if the similarity between the first distance information and the second distance information is greater than or equal to the first threshold, the first vehicle 100 generally determines that the second vehicle 200 is a normal vehicle, but when a warning message about the second vehicle 200 is received, the first vehicle 100 may determine a state of the second vehicle 200 by taking into account the warning message.

The warning message may include a message indicating that the second vehicle 200 is an abnormal vehicle or a message indicating that the first packet broadcasted from the second vehicle 200 is forged, but is not limited thereto.

According to an embodiment, the neighboring vehicle may broadcast the warning message about the second vehicle 200 when the neighboring vehicle receives the second packet earlier than the first packet from the second vehicle 200 or an abnormal driving pattern is sensed from the second vehicle 200.

In operation S750, the first vehicle 100 may determine whether reliability of the neighboring vehicle which has transmitted the warning message is greater than a second threshold.

In operation S760, if the similarity between the first distance information and the second distance information is greater than or equal to the first threshold, and if the reliability of the neighboring vehicle which has transmitted the warning message is less than or equal to the second threshold, the first vehicle 100 may determine that the second vehicle 200 is a normal vehicle. For example, when the reliability of the neighboring vehicle which has transmitted the warning message is very low, the first vehicle 100 may ignore the warning message.

In operation S770, if the similarity between the first distance information and the second distance information is greater than or equal to the first threshold, and if the reliability of the neighboring vehicle which has transmitted the warning message is greater than the second threshold, the first vehicle 100 may determine that the second vehicle 200 is an abnormal vehicle.

In operation S780, the first vehicle 100 may broadcast an authentication result for the second vehicle 200. Since operation S780 corresponds to operation S670 of FIG. 6, a detailed description thereof is not repeated here.

The sequence of some of operations S710 to S780 of FIG. 7 may be changed or some of operations S710 to S780 of FIG. 7 may be omitted. For example, operation S740 may be performed earlier than operation S710, and operation S750 may be omitted.

Figure 8:
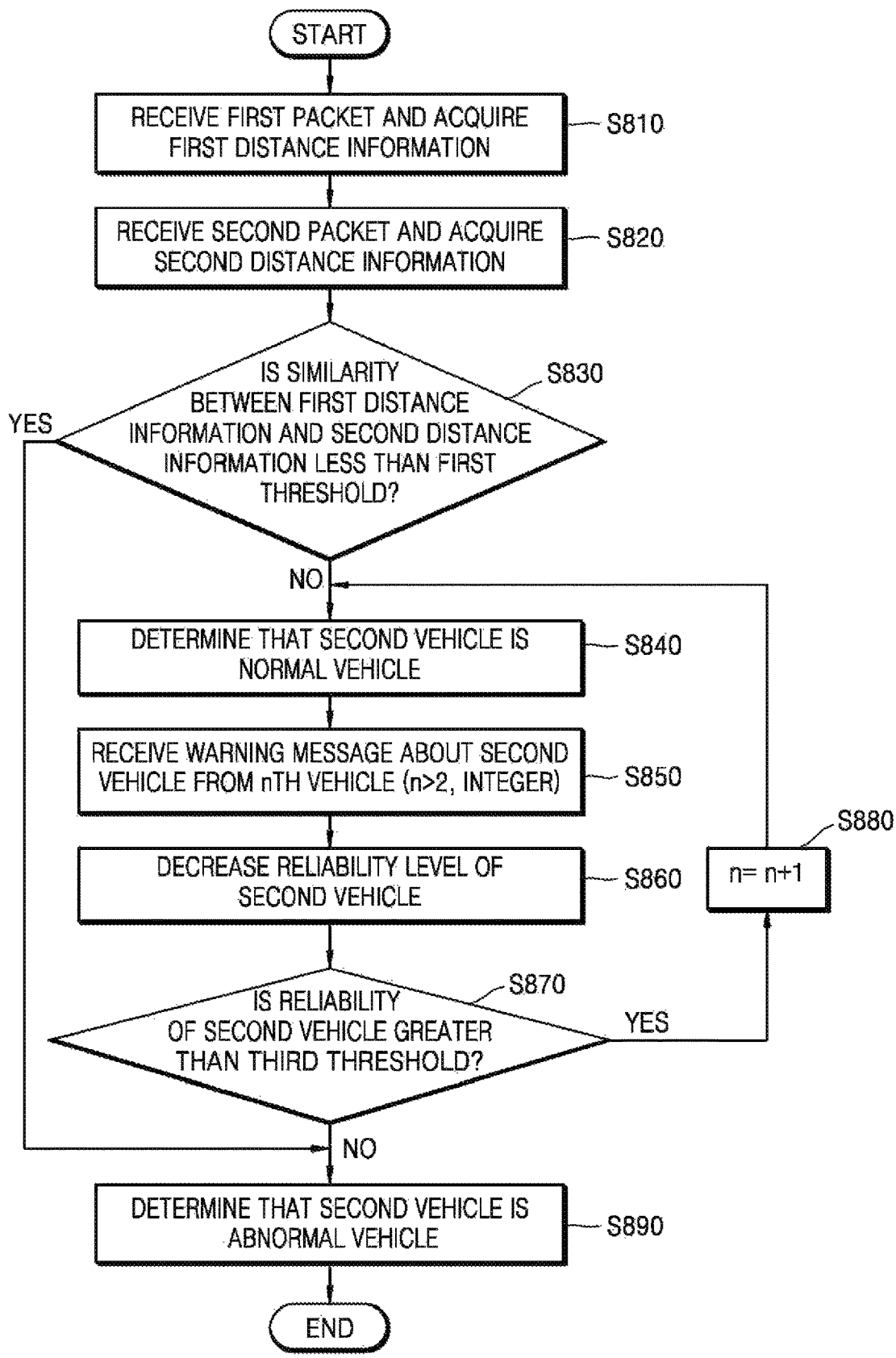
FIG. 8 is a flowchart illustrating an example method of adjusting the reliability of a second vehicle based on a warning message received from a neighboring vehicle, according to an example embodiment.

FIG. 8 is a flowchart illustrating an example method of adjusting the reliability of the second vehicle 200 based on a warning message received from a neighboring vehicle, according to an example embodiment.

In operation S810, the first vehicle 100 may receive the first packet including position information of the second vehicle 200 and the first identity information from the second vehicle 200 through the first communication scheme and acquire the first distance information. For example, the first vehicle 100 may acquire information (first information) about a distance between the first vehicle 100 and the second vehicle 200 (first distance) by comparing a position value $(X_1, Y_1)$ of the second vehicle 200 at a specific time point when the first packet was transmitted and a position value $(X_2, Y_2)$ of the first vehicle 100 at the specific time point. Since operation S810 corresponds to operations S210 and S230 of FIG. 2, a detailed description thereof is not repeated here.

In operation S820, the first vehicle 100 may receive the second packet including the first identity information from the second vehicle 200 through the second communication scheme and acquire the second distance information. For example, the first vehicle 100 may measure the interval between the first time point when the first packet was received and the second time point when the second packet was received and previously obtain the transmission speed of the second communication scheme, and thus the first vehicle 100 may calculate information (second distance information) about a distance between the first vehicle 100 and the second vehicle 200 (hereinafter, second distance) by using the measured interval between the first time point and the second time point and the transmission speed of the second communication scheme. Since operation S820 corresponds to operations S220 and S240 of FIG. 2, a detailed description thereof is not repeated here.

In operation S830, the first vehicle 100 may determine whether the similarity between the first distance information and the second distance information is less than the first threshold (or whether a difference between the first distance and the second distance is greater than or equal to the threshold). For example, when the first distance is 100 m and the second distance is 200 m, the first vehicle 100 may determine that the similarity between the first distance information and the second distance information is less than the first threshold (e.g., 90%). However, when the first distance is 100 m and the second distance is 102 m, the first vehicle 100 may determine that the similarity between the first distance information and the second distance information is greater than or equal to the first threshold (e.g., 90%).

In operation S890, if the similarity between the first distance information and the second distance information is less than the first threshold, the first vehicle 100 may determine that the second vehicle 200 is an abnormal vehicle.

In operation S840, if the similarity between the first distance information and the second distance information is greater than or equal to the first threshold, the first vehicle 100 may determine that the second vehicle 200 is a normal vehicle.

In operation S850, the first vehicle 100 may receive a warning message about the second vehicle 200 from an nth vehicle (e.g., a third vehicle). The warning message may include a message indicating that the second vehicle 200 is an abnormal vehicle or a message indicating that the first packet broadcasted from the second vehicle 200 is forged, but is not limited thereto.

In operation S860, the first vehicle 100 may adjust the reliability of the second vehicle 200 so as to be decreased since the warning message about the second vehicle 200 has been received. For example, the first vehicle 100 may adjust the reliability of the second vehicle 200 so as to be decreased by one level from a tenth level to a ninth level.

In operation S870, the first vehicle 100 may determine whether the adjusted reliability of the second vehicle 200 is greater than a third threshold.

In operations S880 and S840, if the adjusted reliability of the second vehicle 200 is greater than the third threshold, the first vehicle 100 may determine that the second vehicle 200 is a normal vehicle unless another warning message is received.

If the first vehicle 100 receives a warning message about the second vehicle 200 from an (n+1)th vehicle (e.g., a fourth vehicle) in operation S850, the first vehicle 100 may adjust the reliability of the second vehicle 200 so as to be decreased in operation S860. For example, the first vehicle 100 may adjust the reliability of the second vehicle 200 so as to be decreased by one level from the ninth level to the eighth level.

Thereafter, in operation S870, the first vehicle 100 may determine whether the adjusted reliability of the second vehicle 200 is greater than the third threshold.

In operations S880 and S840, if the adjusted reliability of the second vehicle 200 is greater than the third threshold, the first vehicle 100 may determine that the second vehicle 200 is a normal vehicle unless another warning message is received, and in operation S890, if the adjusted reliability of the second vehicle 200 is less than or equal to the third threshold, the first vehicle 100 may determine that the second vehicle 200 is an abnormal vehicle.

Figure 9:
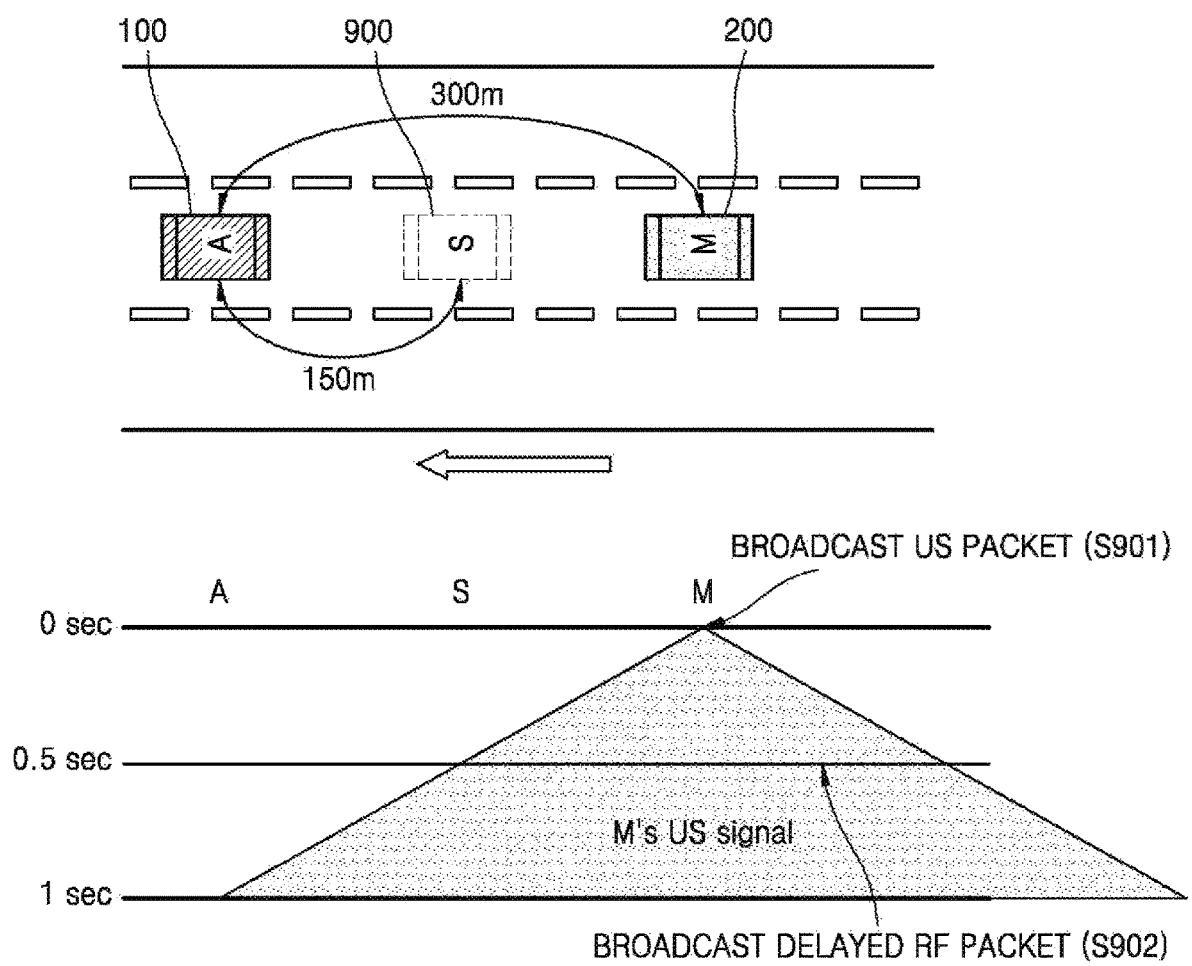
FIG. 9 is a diagram illustrating an example operation of maliciously controlling, by a second vehicle, transmission time points of packets, according to an example embodiment.

FIG. 9 is a diagram illustrating an example operation of maliciously controlling, by a second vehicle, transmission time points of packets, according to an example embodiment. In FIG. 9, it is assumed that the first packet is an RF packet broadcasted through an RF channel, and the second packet is a US packet broadcasted through a US communication channel.

As illustrated in FIG. 9, the second vehicle 200 may control transmission time points of the US packet and the RF packet to deceive the first vehicle 100 such that the first vehicle 100 recognizes that the second vehicle 200 is located at an S position 900 (e.g., 150 m behind the first vehicle 100) even though the second vehicle 200 is located at an M position (e.g., 300 m behind the first vehicle 100). For example, when the RF packet is transmitted to the first vehicle 100 for 0.001 seconds, the US packet is transmitted to the first vehicle 100 for one second, and a transmission speed of an ultrasonic wave is 300 m/s, the second vehicle 200 may intentionally broadcast the US packet first in operation S901 and broadcast the RF packet after 0.5 seconds in operation S902. In this case, the RF packet may include fake position information indicating that the second vehicle 200 is located 150 m behind the first vehicle 100.

In this case, the first vehicle 100 may predict that the second distance between the first vehicle 100 and the second vehicle 200 is 150 m since an interval between a time point when the RF packet was received and a time point when the US packet was received is 0.5 seconds. In addition, the RF packet also includes information indicating that the second vehicle 200 is located 150 m behind the first vehicle 100, and thus the first vehicle 100 cannot help but be deceived that the second vehicle 200 is located 150 m behind.

However, when another vehicle besides the first vehicle 100 and the second vehicle 200 exists on the road, it may be difficult for the second vehicle 200 to deceive the first vehicle 100 about a position of the second vehicle 200. This will be described in greater detail below with reference to FIG. 10.

Figure 10:
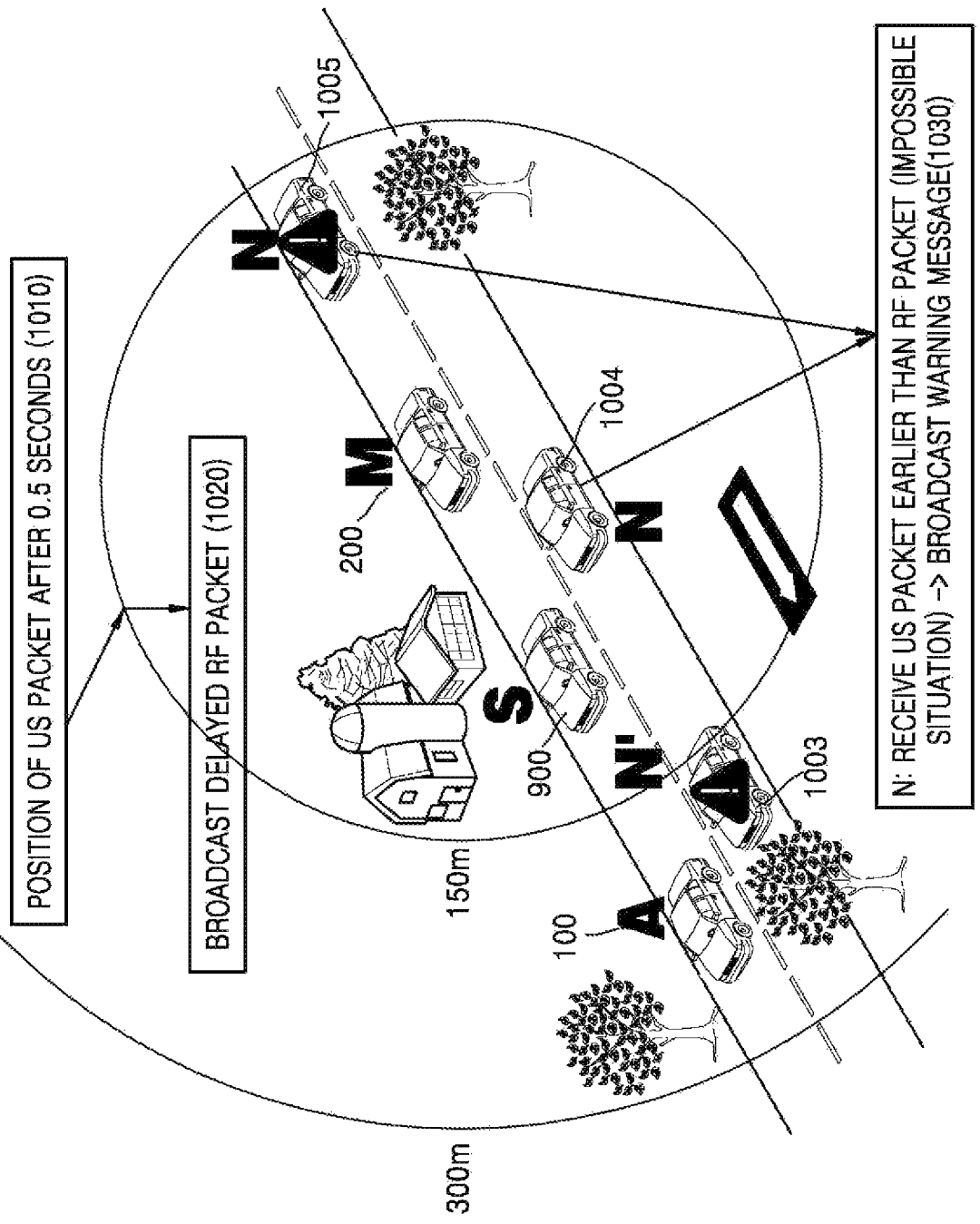
FIG. 10 is a diagram illustrating an example operation of authenticating a second vehicle using warning messages collected from neighboring vehicles, according to an example embodiment.

FIG. 10 is a diagram illustrating an example operation of authenticating the second vehicle 200 using warning messages collected from neighboring vehicles, according to an example embodiment. In FIG. 10, it is assumed that a transmission speed of an ultrasonic wave is 300 m/s.

The second vehicle 200 may first broadcast a US packet and then broadcast an RF packet after 0.5 seconds elapses. When 0.5 seconds elapses after the second vehicle 200 broadcasts the US packet, the US packet may be transmitted up to a position of 150 m away from the second vehicle 200 in operation 1010. Therefore, vehicles 1004 and 1005 within 150 m from the second vehicle 200 may receive the US packet earlier than the RF packet and determine that the second vehicle 200 is an abnormal vehicle. Since a transmission speed of a communication scheme using a radio frequency is much faster than a transmission speed of a communication scheme using an ultrasonic wave, when the US packet and the RF packet were broadcasted at the same tile, it is impossible that the US packet is received earlier than the RF packet.

Therefore, the vehicles 1004 and 1005 may broadcast a warning message indicating that the second vehicle 200 is an abnormal vehicle in operation 1030.

In this case, the first vehicle 100 may receive the warning message about the second vehicle 200 before the US packet and the RF packet broadcasted from the second vehicle 200 are received.

In addition, a third vehicle 1003 located at 200 m ahead from the second vehicle 200 may receive the RF packet earlier than the US packet, but a difference between the first distance information (e.g., a distance between the second vehicle 200 and the third vehicle 1003 is 50 m) calculated based on position information of the second vehicle 200, which is included in the RF packet, and the second distance information (e.g., a distance between the second vehicle 200 and the third vehicle 1003 is 48 m) calculated by measuring a difference between reception time points of the US packet and the RF packet is greater than the threshold, and thus the third vehicle 1003 may determine that the second vehicle 200 is an abnormal vehicle.

Therefore, according to an embodiment, when another reliable vehicle exists between the first vehicle 100 and the second vehicle 200, it may be almost impossible that the second vehicle 200 maliciously deceive the first vehicle 100.

Figure 11:
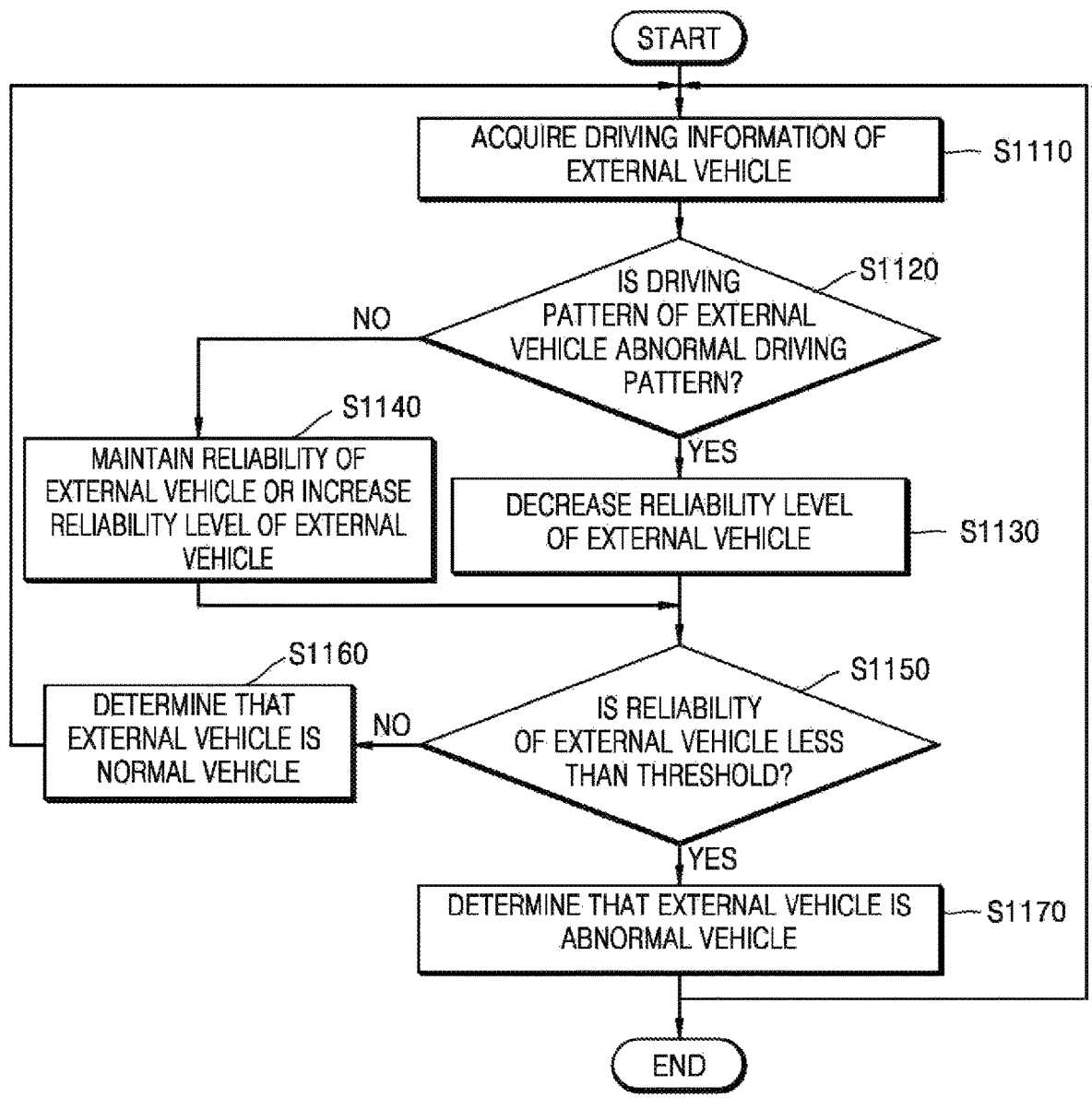
FIG. 11 is a flowchart illustrating an example method of authenticating an external vehicle based on driving information of the external vehicle, according to an example embodiment.

FIG. 11 is a flowchart illustrating an example method of authenticating an external vehicle based on driving information of the external vehicle, according to an example embodiment.

In operation S1110, the first vehicle 100 may acquire driving information of an external vehicle. For example, referring to FIG. 12, the first vehicle 100 may acquire the driving information of a first external vehicle 1200 based on context information of the first external vehicle 1200 (e.g., a driving speed of the first external vehicle 1200, a minimum bumper-to-bumper distance, a desired dynamic distance, a maximum acceleration of the first external vehicle 1200, a maximum deceleration of the first external vehicle 1200, and the like). According to an embodiment, the driving information of the first external vehicle 1200 may include information about a distance between vehicles, information about a current speed of the first external vehicle 1200, information about sudden deceleration or sudden acceleration of the first external vehicle 1200, information about traffic rule observance of the first external vehicle 1200, information about a moving path of the first external vehicle 1200, information about a maximum speed of the first external vehicle 1200, information about a mean driving time of the first external vehicle 1200, and the like but is not limited thereto.

Figure 13:
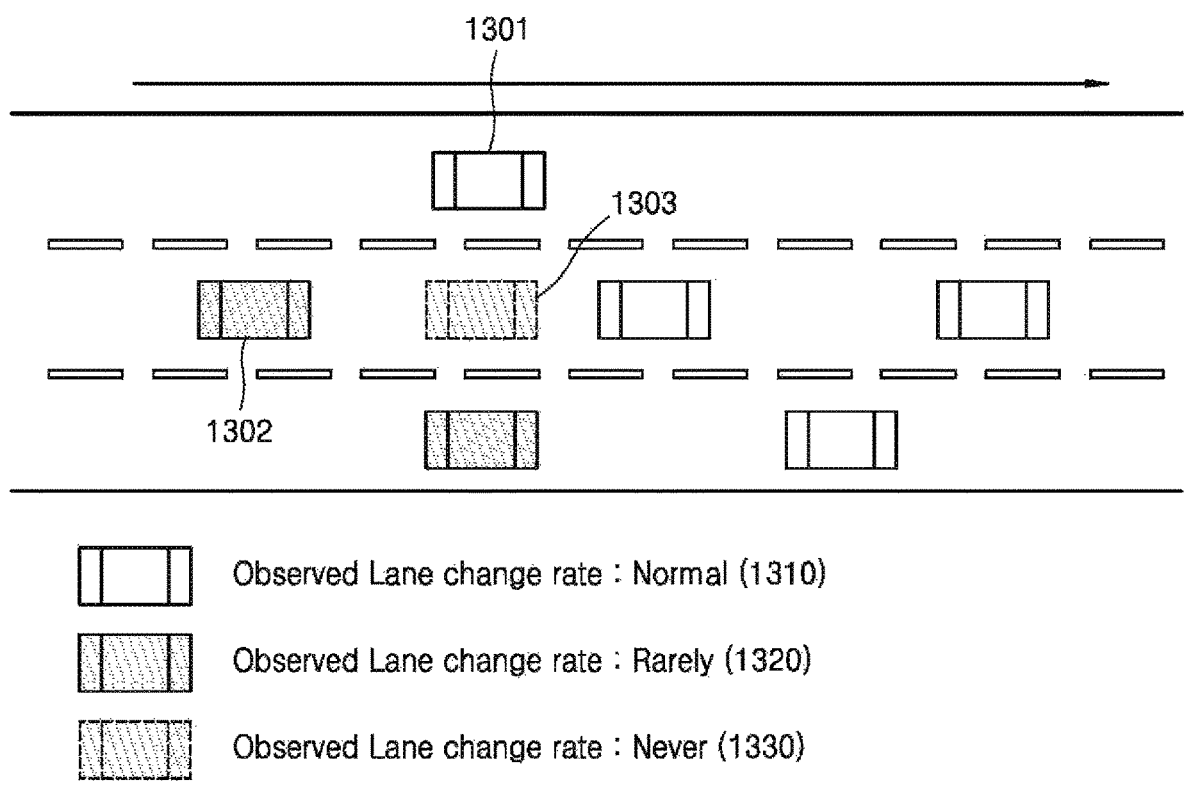
FIG. 13 is a diagram illustrating an example algorithm for acquiring lane change information of a vehicle based on context information, according to an example embodiment.

Referring to FIG. 13, the first vehicle 100 may acquire lane change information of the external vehicle as the driving information of the external vehicle based on context information of the external vehicle (e.g., information about a driving lane). For example, (1) when a lane change rate of a first external vehicle 1301 while driving a certain distance is greater than or equal to a first threshold (e.g., 10 times), the first vehicle 100 may classify a lane change level of the first external vehicle 1301 as a "normal" level 1310, (2) when the lane change rate of a second external vehicle 1302 is between the first threshold (e.g., 10 times) and a second threshold (e.g., one time), the first vehicle 100 may classify the lane change level of the second external vehicle 1302 as a "rarely" level 1320, and (3) when the lane change rate of a third external vehicle 1303 is less than the second threshold (e.g., one time), the first vehicle 100 may classify the lane change level of the third external vehicle 1303 as a "never" level 1330.

According to an embodiment, the first vehicle 100 may sense a driving pattern of the external vehicle based on the driving information of the external vehicle. According to an embodiment, the first vehicle 100 may receive driving pattern information of the external vehicle, which has been analyzed based on the driving information of the external vehicle, from an external server or base station.

In operation S1120, the first vehicle 100 may determine whether the driving pattern of the external vehicle is an abnormal driving pattern.

According to an embodiment, the first vehicle 100 may determine whether the driving pattern of the external vehicle is an abnormal driving pattern, using the driving information of the external vehicle, which has been acquired based on context information of the external vehicle (see, e.g., FIG. 12). For example, when the first vehicle 100 acquires driving information indicating that the external vehicle is driving at a maximum speed or more of the external vehicle (e.g., driving at 400 Km/h), the first vehicle 100 may determine that the driving pattern of the external vehicle is an abnormal driving pattern. In addition, when the first vehicle 100 acquires driving information indicating that a distance between the external vehicle and a vehicle driving ahead is less than or equal to the minimum bumper-to-bumper distance (e.g., 2 m) or acquire driving information indicating that the external vehicle is driving at a position overlapping that of a vehicle driving ahead, the first vehicle 100 may determine that the driving pattern of the external vehicle is an abnormal driving pattern.

According to an embodiment, when a degree of sudden deceleration or sudden acceleration of the external vehicle exceeds a normal range (e.g., sudden deceleration from 300 Km/h to 0 or sudden acceleration from 0 to 200 Km/h), it may be determined that the driving pattern of the external vehicle is an abnormal driving pattern.

According to an embodiment, when driving information indicating that the external vehicle ignores all traffic rules (e.g., signal violation, speed violation, parking violation, lane change violation, and the like) is acquired, the first vehicle 100 may determine that the driving pattern of the external vehicle is an abnormal driving pattern.

According to an embodiment, when driving information indicating that the external vehicle is driving a place which is not the road is acquired, the first vehicle 100 may determine that the driving pattern of the external vehicle is an abnormal driving pattern.

According to an embodiment, the first vehicle 100 may determine whether the driving pattern of the external vehicle is an abnormal driving pattern, by using lane change information of the external vehicle (see, e.g., FIG. 13). For example, when the external vehicle driving on an expressway does not change a lane even once, the first vehicle 100 may determine that the driving pattern of the external vehicle is abnormal.

In operation S1130, if the first vehicle 100 determines that the driving pattern of the external vehicle is an abnormal driving pattern, the first vehicle 100 may adjust reliability of the external vehicle so as to be decreased. For example, the first vehicle 100 may adjust the reliability of the second vehicle 200 so as to be decreased by one level from the tenth level to the ninth level.

According to an embodiment, levels to be adjusted down may vary according to types of the abnormal driving pattern. For example, the first vehicle 100 may adjust a level of the reliability so as to be decreased by one level when the abnormal driving pattern is a traffic rule violation pattern, adjust the level of the reliability so as to be decreased by two levels when the abnormal driving pattern is a sudden deceleration or sudden acceleration pattern, and adjust the level of the reliability so as to be decreased by three levels when the abnormal driving pattern is a pattern of driving a place that is not the road or driving at a position overlapping that of another vehicle.

In operation S1140, the first vehicle 100 may maintain the reliability of the external vehicle or adjust the reliability of the external vehicle so as to be increased when the driving pattern of the external vehicle is not an abnormal driving pattern.

In operation S1150, the first vehicle 100 may determine whether the reliability of the external vehicle is less than a threshold. In operation S1160, if the reliability of the external vehicle is greater than or equal to the threshold, the first vehicle 100 may determine that the external vehicle is a normal vehicle. In operation S1170, if the reliability of the external vehicle is less than the threshold, the first vehicle 100 may determine that the external vehicle is an abnormal vehicle.

According to an embodiment, the first vehicle 100 may periodically receive driving information of neighboring vehicles, and if a driving pattern of a neighboring vehicle is not a normal vehicle driving pattern, the first vehicle 100 may determine that the neighboring vehicle is a fake vehicle or an attacking vehicle.

FIG. 14 is a diagram illustrating an example security table 1400 according to an example embodiment.

Referring to FIG. 14, the security table 1400 may include a reliability level 1410, a definition 1420, and a state 1430. For example, the reliability level 1410 may be configured from a $0^{th}$ level to tenth level, and the reliability level 1410 may be divided into a plurality of sections such that each section may, for example, be defined as "trustworthy (8 to 10), fair (6 to 8), suspicious (4 to 6), poor (2 to 4), and blacklist (0 to 2)". In this case, when the reliability level 1410 of an external vehicle is 6 to 10, the external vehicle may be determined as a normal vehicle, and when the reliability level 1410 of an external vehicle is 0 to 6, the external vehicle may be determined as an abnormal vehicle, but the present embodiment is not limited thereto.

The security table 1400 is not limited to the form illustrated in FIG. 14 and may be implemented in various forms.

Figure 15:
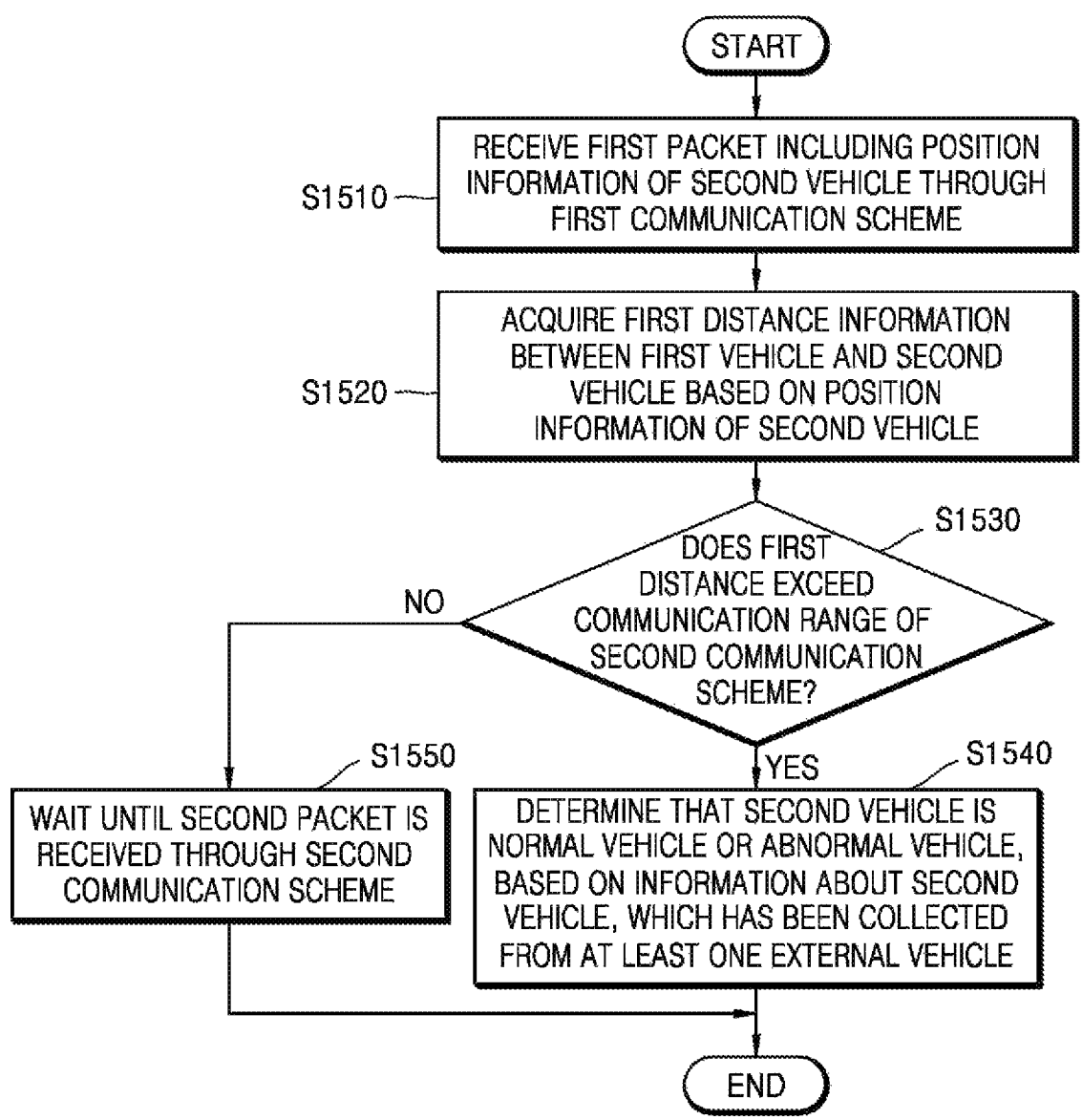
FIG. 15 is a flowchart illustrating an example method of operating a witness vehicle, according to an example embodiment.

FIG. 15 is a flowchart illustrating an example method of operating a witness, according to an example embodiment.

In operation S1510, the first vehicle 100 may receive the first packet including position information of the second vehicle 200 through the first communication scheme. The first packet may include the first identity information, and the position information of the second vehicle 200. The first communication scheme may be a communication scheme using a radio frequency. Since operation S1510 corresponds to operation S210 of FIG. 2, a detailed description thereof is not repeated here.

In operation S1520, the first vehicle 100 may acquire the first distance information between the first vehicle 100 and the second vehicle 200 based on the position information of the second vehicle 200. For example, the first vehicle 100 may calculate the first distance between the first vehicle 100 and the second vehicle 200 by using the position information of the second vehicle 200, which is included in the first packet. The first vehicle 100 may calculate the first distance by comparing a position value $(X_1, Y_1)$ of the second vehicle 200 at the first time point when the first packet was transmitted and a position value $(X_2, Y_2)$ of the first vehicle 100 at the first time point. When a transmission speed of the first packet is fast, the first vehicle 100 may calculate the first distance by comparing a position value $(X_1, Y_1)$ of the second vehicle 200 at the first time point when the first packet was transmitted and a position value $(X_2, Y_2)$ of the first vehicle 100 at the second time point when the first packet was received. Since operation S1520 corresponds to operation S230 of FIG. 2, a detailed description thereof is not repeated here.

In operation S1530, the first vehicle 100 may determine whether the first distance between the first vehicle 100 and the second vehicle 200 exceeds a communication range of the second communication scheme. For example, when a distance between the first vehicle 100 and the second vehicle 200 is 100 m, and the communication range of the second communication scheme is 50 m, the first vehicle 100 may determine that the first distance exceeds the communication range of the second communication scheme. However, when a distance between the first vehicle 100 and the second vehicle 200 is 50 m, and the communication range of the second communication scheme is 100 m, the first vehicle 100 may determine that the first distance is within the communication range of the second communication scheme.

Since operation S1530 corresponds to operation S430 of FIG. 4, a detailed description thereof is not repeated here.

In operation S1540, if the first distance exceeds the communication range of the second communication scheme, the first vehicle 100 may determine that the second vehicle 200 is a normal vehicle or an abnormal vehicle, based on information about the second vehicle 200, which has been collected from at least one external vehicle.

According to an embodiment, when the first distance exceeds the communication range of the second communication scheme, the first vehicle 100 cannot receive the second packet. Therefore, the first vehicle 100 cannot authenticate the second vehicle 200 only with the first packet and may authenticate the second vehicle 200 by further considering information collected from the external vehicle. The information about the second vehicle 200, which has been collected from the external vehicle, may include a warning message indicating that the second vehicle 200 is an abnormal vehicle, a message indicating that the second vehicle 200 is a normal vehicle, or driving information of the second vehicle 200, but is not limited thereto.

According to an embodiment, the first vehicle 100 may determine a state of the second vehicle 200 based on the number of warning messages collected from external vehicles. For example, when a warning message indicating that the second vehicle 200 is an abnormal vehicle is received 500 times, and a message indicating that the second vehicle 200 is a normal vehicle is received three times, the first vehicle 100 may determine that the second vehicle 200 is an abnormal vehicle.

According to an embodiment, the first vehicle 100 may determine that the second vehicle 200 is an abnormal vehicle when the first vehicle 100 determines that a driving pattern of the second vehicle 200 is an abnormal driving pattern as a result of analyzing driving information of the second vehicle 200, which has collected from external vehicles.

In operation S1550, if the first distance between the first vehicle 100 and the second vehicle 200 is within the communication range of the second communication scheme, the first vehicle 100 may wait until the second packet is received through the second communication scheme. For example, the first vehicle 100 may wait until the second packet including the same identity information as that included in the first packet is received through the second communication scheme. In addition, the first vehicle 100 may verify a location (existence) of the second vehicle 200 based on an interval between a time point when the first packet was received and a time point when the second packet was received and a transmission speed of the second communication scheme.

Figure 16:
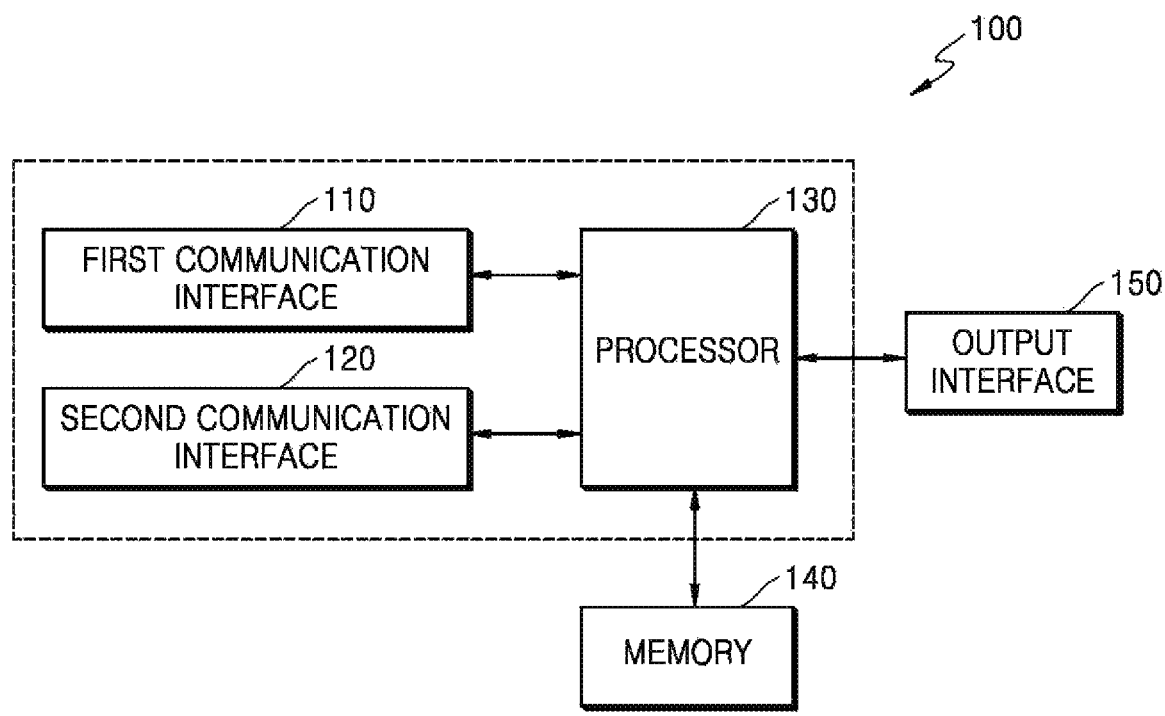
FIG. 16 is a block diagram illustrating an example configuration of a first vehicle, according to an example embodiment.

FIG. 16 is a block diagram illustrating an example configuration of the first vehicle 100, according to an example embodiment.

Referring to FIG. 16, the first vehicle 100 may include a first communication interface (e.g., including communication circuitry) 110, a second communication interface (e.g., including communication circuitry) 120, and a processor (e.g., including processing circuitry) 130. According to an embodiment, the first vehicle 100 may include a memory 140 and an output interface (e.g., including output circuitry) 150. Each configuration will be sequentially described.

The first communication interface 110 may include various communication circuitry and be an interface configured to transmit or receive a packet through the first communication scheme. According to an embodiment, the first communication interface 110 may include a wireless communication interface. For example, the first communication interface 110 may include communication circuitry for various communication schemes, such as, for example, and without limitation, a short-range communication interface (e.g., a Bluetooth communication interface, a BLE communication interface, a near-field wireless communication interface (NFC/radio frequency identification (RFID) interface), a WLAN (Wi-Fi) communication interface, a Zigbee communication interface, an IrDA communication interface, a WFD communication interface, a UWB communication interface, an Ant+ communication interface, or the like), or a mobile communication interface (e.g., a 2G, 3G, 4G, or LTE communication interface), but is not limited thereto.

According to an embodiment, the first communication interface 110 may receive the first packet including position information of the second vehicle 200 and the first identity information from the second vehicle 200 through the second communication scheme. The first communication interface 110 may deliver the received first packet to the processor 130. In addition, the first communication interface 110 may periodically broadcast a packet including position information of the first vehicle 100 and second identity information.

According to an embodiment, the first communication interface 110 may broadcast a warning message indicating that the second vehicle 200 is an abnormal vehicle when similarity between the first distance information and the second distance information is less than a threshold.

According to an embodiment, the first communication interface 110 may receive, from a third vehicle, a warning message indicating that the second vehicle 200 is an abnormal vehicle.

The second communication interface 120 may include various communication circuitry and be an interface configured to transmit or receive a packet through the second communication scheme. For example, the second communication interface 120 may receive the second packet including the first identity information from the second vehicle 200 through the second communication scheme that is different from the first communication scheme. In this case, the second communication interface 120 may broadcast both an RF packet including position information of the first vehicle 100 and a US packet including the same as identity information as that included in the RF packet According to an embodiment, the second communication interface 120 may include an ultrasonic sensor and a microphone but is not limited thereto.

The processor 130 may include various processing circuitry and commonly control the general operation of the first vehicle 100. The processor 130 may control the first communication interface 110, the second communication interface 120, the memory 140, and the output interface 150 by executing programs stored in the memory 140.

According to an embodiment, the processor 130 may acquire the first distance information between the first vehicle 100 and the second vehicle 200 based on position information of the second vehicle 200, which is included in the first packet. The processor 130 may acquire the second distance information between the first vehicle 100 and the second vehicle 200 based on an interval between the first time point when the first packet was received and the second time point when the second packet was received and a transmission speed of the second communication scheme. The processor 130 may authenticate the second vehicle 200 based on a similarity between the first distance information and the second distance information. For example, the processor 130 may determine the second vehicle 200 as an abnormal vehicle when the similarity between the first distance information and the second distance information is less than a threshold and determine the second vehicle 200 as a normal vehicle when the similarity between the first distance information and the second distance information is greater than or equal to the threshold.

The processor 130 may determine the second vehicle 200 as an abnormal vehicle based on a warning message received from a third vehicle.

The processor 130 may determine reliability of the second vehicle 200 based on driving information of the second vehicle 200 and, when the reliability is less than a threshold, determine the second vehicle 200 as an abnormal vehicle.

The processor 130 may receive a third packet including third identity information from a fourth vehicle through the second communication scheme and then receive a fourth packet including position information of the fourth vehicle and the third identity information from the fourth vehicle through the first communication scheme. In this case, when a transmission speed of the first communication scheme is faster than a transmission speed of the second communication scheme, and the third packet and the fourth packet are simultaneously transmitted from the fourth vehicle, it is impossible to receive the third packet earlier than the fourth packer, and thus the processor 130 may determine the fourth vehicle as an abnormal vehicle.

The processor 130 may adjust reliability of a fifth vehicle so as to be decreased when a sixth packet including fifth identity information is not received from the fifth vehicle through the second communication scheme after receiving a fifth packet including position information of the fifth vehicle and the fifth identity information, which has been transmitted from the fifth vehicle through the first communication scheme.

The memory 140 may store programs for processing and control of the processor 130 and store input/output data (e.g., identity information of an external vehicle, driving information of the external vehicle, a warning message for the external vehicle, an authentication result for the external vehicle, and reliability of the external vehicle). The memory 140 may include at least one type of storage medium among a flash memory type memory, a hard disk type memory, a multimedia card micro type memory, a card-type memory (e.g., a secure digital (SD) or extreme digital (xD) memory), a random access memory (RAM), a static RAM (SRAM), a read-only memory (ROM), an electrically erasable programmable read-only memory (EEPROM), a PROM, a magnetic memory, a magnetic disk, and an optical disc. In addition, the first vehicle 100 may operate a web storage or a cloud server configured to perform a storage function of the memory 140.

The output interface 150 may include various output circuitry and is configured to output an audio signal, a video signal, or a vibration signal and may include a display, an acoustic output interface, a vibration motor, and the like.

The display may display information processed by the first vehicle 100. For example, the display may display a map including a driving path, display positions of external vehicles, and display a current speed, a remaining amount of fuel, and the like but is not limited thereto. The display may display a user interface (UI) or graphical user interface (GUI) related to a call when the first vehicle 100 is in a call mode. When the display and a touch pad form a layer structure to configure a touch screen, the display may be used as not only an output device but also an input device. The display may include at least one of a liquid crystal display, a thin-film transistor liquid crystal display, an organic light-emitting diode, a flexible display, a three-dimensional (3D) display, and an electrophoretic display, or the like, but is not limited thereto. The first vehicle 100 may include two or more displays according to an implementation form of the first vehicle 100.

According to an embodiment, the display may include a transparent display. The transparent display may be implemented in a transparent liquid crystal display (LCD) type, a transparent thin-film electroluminescent panel (TFEL) type, a transparent OLED type, or a projection type, or the like, but is not limited thereto. The projection type indicates a display configured to project an image on a transparent screen, like a head up display (HUD).

The acoustic output interface may output audio data received from the first communication interface 110 or the second communication interface 120 or stored in the memory 140. In addition, the acoustic output interface may output an acoustic signal related to a function performed by the first vehicle 100. The acoustic output interface may include a speaker, a buzzer, or the like, but is not limited thereto. The vibration motor may output a vibration signal. For example, the vibration motor may output a vibration signal corresponding to an output of audio data or video data (e.g., a call signal reception sound or a message reception sound).

According to an embodiment, although not shown in FIG. 16, the first vehicle 100 may include a user input interface. The user input interface may refer, for example, to various circuitry implementing a means by which a user inputs data to control the first vehicle 100. For example, the user input interface may include various user input circuitry, such as, for example, and without limitation, a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, or the like, but is not limited thereto.

According to an embodiment, although not shown in FIG. 16, the first vehicle 100 may include other sensors besides the ultrasonic sensor. For example, the first vehicle 100 may include at least one of a magnetic sensor, an acceleration sensor, a temperature/humidity sensor, an IR sensor, a gyroscope sensor, a position sensor (e.g., GPS), an atmospheric pressure sensor, a proximity sensor, and an RGB (illuminance) sensor, but is not limited thereto. A function of each sensor may be intuitively inferred by those of ordinary skill in the art from a name thereof, and thus a detailed description thereof is omitted herein.

The method according to an embodiment may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the present disclosure or may be known to and usable by one of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level programming language that may be executed by a computer using an interpreter as well as a machine language code made by a complier.

Some embodiments may be implemented in a form of a recording medium including computer-executable instructions such as a program module executed by a computer system. A non-transitory computer-readable medium may be an arbitrary available medium which may be accessed by a computer system and includes all types of volatile and nonvolatile media and separated and non-separated media. In addition, the non-transitory computer-readable medium may include all types of computer storage media and communication media. The computer storage media include all types of volatile and nonvolatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media. In addition, some embodiments may also be implemented by a computer program including computer-executable instructions, such as a computer program to be executed by a computer, or a computer program product.

It should be understood that the various example embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims and their equivalents.

What is claimed is:

1. A method for authenticating a first vehicle to a second vehicle, the method comprising:
receiving a first packet including position information of the second vehicle and first identity information from the second vehicle through a first communication scheme;
receiving a second packet including the first identity information from the second vehicle through a second communication scheme different from the first communication scheme;
acquiring first distance information about a distance between the first vehicle and the second vehicle based on the position information of the second vehicle;
acquiring second distance information about a distance between the first vehicle and the second vehicle based on an interval between a first time point when the first packet is received and a second time point when the second packet is received and a transmission speed of the second communication scheme; and
authenticating the second vehicle based on the first distance information and the second distance information.

2. The method of claim 1, wherein a transmission speed of the first communication scheme is faster than the transmission speed of the second communication scheme.

3. The method of claim 2, wherein the first communication scheme comprises a radio frequency communication scheme, and
the second communication scheme comprises an ultrasonic wave communication scheme.

4. The method of claim 1, wherein the acquiring of the second distance information comprises acquiring the second distance information between the first vehicle and the second vehicle based on at least one of: a transmission speed of the first communication scheme and a moving speed of the first vehicle.

5. The method of claim 1, wherein the authenticating of the second vehicle comprises:
determining the second vehicle as an abnormal vehicle when a similarity between the first distance information and the second distance information is less than a threshold; and
determining the second vehicle as a normal vehicle when the similarity between the first distance information and the second distance information is greater than or equal to the threshold.

6. The method of claim 1, further comprising broadcasting a warning message that the second vehicle is an abnormal vehicle when a similarity between the first distance information and the second distance information is less than a threshold.

7. The method of claim 1, wherein the authenticating of the second vehicle comprises:
receiving, from a third vehicle, a warning message indicating that the second vehicle is an abnormal vehicle; and
determining that the second vehicle is an abnormal vehicle based on the warning message.

8. The method of claim 1, wherein the authenticating of the second vehicle comprises:
determining a reliability of the second vehicle based on driving information of the second vehicle; and
determining the second vehicle is an abnormal vehicle when the reliability is less than a threshold.

9. The method of claim 8, wherein the determining of the reliability of the second vehicle comprises decreasing a level of the reliability of the second vehicle from a first level to a second level when an abnormal driving pattern of the second vehicle is determined.

10. The method of claim 2, further comprising determining a fourth vehicle is an abnormal vehicle when a third packet including third identity information is received from the fourth vehicle through the second communication scheme and then a fourth packet including position information of the fourth vehicle and the third identity information is received from the fourth vehicle through the first communication scheme.

11. The method of claim 1, further comprising:
receiving a fifth packet including position information of a fifth vehicle and fifth identity information from the fifth vehicle through the first communication scheme; and
decreasing a level of reliability of the fifth vehicle when a sixth packet including the fifth identity information is not received from the fifth vehicle through the second communication scheme within a certain time.

12. The method of claim 1, further comprising:
receiving a seventh packet including position information of a sixth vehicle and seventh identity information from the sixth vehicle through the first communication scheme;
acquiring third distance information between the first vehicle and the sixth vehicle based on the position information of the sixth vehicle;
determining whether a distance between the sixth vehicle and the first vehicle exceeds a communication range of the second communication scheme, based on the third distance information; and
determining the sixth vehicle as a normal vehicle or an abnormal vehicle based on information about the sixth vehicle when the distance between the sixth vehicle and the first vehicle exceeds the communication range of the second communication scheme, the information about the sixth vehicle being collected from at least one external vehicle.

13. A first vehicle comprising:
a first communication interface comprising communication circuitry configured to receive a first packet including position information of a second vehicle and first identity information from the second vehicle through a first communication scheme;
a second communication interface comprising communication circuitry configured to receive a second packet including the first identity information from the second vehicle through a second communication scheme different from the first communication scheme; and
a processor configured to acquire first distance information about a distance between the first vehicle and the second vehicle based on the position information of the second vehicle, to acquire second distance information about a distance between the first vehicle and the second vehicle based on an interval between a first time point when the first packet is received and a second time point when the second packet is received and a transmission speed of the second communication scheme, and to authenticate the second vehicle based on the first distance information and the second distance information.

14. The first vehicle of claim 13, wherein a transmission speed of the first communication scheme is faster than the transmission speed of the second communication scheme.

15. The first vehicle of claim 14, wherein the first communication interface comprises a wireless communication interface comprising wireless communication circuitry, and the second communication interface comprises an ultrasonic sensor.

16. The first vehicle of claim 13, wherein the processor is further configured to determine the second vehicle is an abnormal vehicle when a similarity between the first distance information and the second distance information is less than a threshold and to determine the second vehicle is a normal vehicle when the similarity between the first distance information and the second distance information is greater than or equal to the threshold.

17. The first vehicle of claim 13, wherein the first communication interface is further configured to broadcast a warning message indicating that the second vehicle is an abnormal vehicle when a similarity between the first distance information and the second distance information is less than a threshold.

18. The first vehicle of claim 13, wherein the first communication interface is further configured to receive, from a third vehicle, a warning message indicating that the second vehicle is an abnormal vehicle, and
the processor is further configured to determine the second vehicle is the abnormal vehicle based on the warning message.

19. The first vehicle of claim 13, wherein the processor is further configured to determine reliability of the second vehicle based on driving information of the second vehicle and determine the second vehicle as an abnormal vehicle when the reliability is less than a threshold.

20. A computer program product comprising a non-transitory computer-readable storage medium having stored thereon instructions which when executed configure a first vehicle to:
receive a first packet including position information of a second vehicle and first identity information from the second vehicle through a first communication scheme;
receive a second packet including the first identity information from the second vehicle through a second communication scheme different from the first communication scheme;
acquire first distance information about a distance between the first vehicle and the second vehicle based on the position information of the second vehicle;
acquire second distance information about a distance between the first vehicle and the second vehicle based on an interval between a first time point when the first packet is received and a second time point when the second packet is received and a transmission speed of the second communication scheme; and
authenticate the second vehicle based on the first distance information and the second distance information.

\* \* \* \* \*